US006915811B2

(12) United States Patent
Blanchette et al.

(10) Patent No.: US 6,915,811 B2
(45) Date of Patent: Jul. 12, 2005

(54) CHEMICAL FEEDER

(75) Inventors: David W. Blanchette, Southington, CT (US); Christopher M. Zetena, Atlanta, GA (US); Michael Paloian, Cold Spring Harbor, NY (US); Anthony R. Orchard, Wantagh, NY (US)

(73) Assignee: Arch Chemicals, Inc., Norwalk, CT (US)

( * ) Notice: Subject to any disclaimer, the term of this patent is extended or adjusted under 35 U.S.C. 154(b) by 275 days.

(21) Appl. No.: 10/307,671

(22) Filed: Dec. 2, 2002

(65) Prior Publication Data

US 2003/0116592 A1 Jun. 26, 2003

Related U.S. Application Data

(60) Provisional application No. 60/338,386, filed on Dec. 4, 2001, and provisional application No. 60/392,727, filed on Jun. 27, 2002.

(51) Int. Cl.[7] ................................................ B01D 11/02
(52) U.S. Cl. ......................... 137/1; 137/268; 422/278; 422/264; 210/169; 210/198.1
(58) Field of Search ..................... 137/1, 268; 422/277, 422/278, 264; 210/169, 198.1, 749, 764, 206

(56) References Cited

U.S. PATENT DOCUMENTS

| | | | |
|---|---|---|---|
| 4,208,376 A | 6/1980 | Sangster et al. ............ 422/261 |
| D297,957 S | 10/1988 | Gordon, III ................ D23/207 |
| 4,917,868 A | 4/1990 | Alexander et al. .......... 422/119 |
| D309,493 S | 7/1990 | Casberg ..................... D23/208 |
| 5,004,549 A | 4/1991 | Wood et al. ................ 210/699 |
| RE33,861 E | 3/1992 | Zetena et al. ............... 137/268 |
| 5,112,521 A | 5/1992 | Mullins et al. ............. 252/180 |
| 5,133,381 A | 7/1992 | Wood et al. ................ 137/268 |
| 5,384,102 A | 1/1995 | Ferguson et al. ........... 422/264 |
| 5,419,355 A | 5/1995 | Brennan et al. ............... 137/1 |
| 5,427,748 A | 6/1995 | Wiedrich et al. ........... 422/264 |
| 5,441,711 A | 8/1995 | Drewery .................... 422/264 |
| 5,536,479 A | 7/1996 | Miller et al. ................ 422/261 |
| 5,765,945 A | 6/1998 | Palmer .................... 366/167.1 |
| 5,810,043 A | * 9/1998 | Grenier ..................... 137/268 |
| 5,928,608 A | 7/1999 | Levesque et al. ............. 422/37 |
| 5,932,093 A | 8/1999 | Chulick ..................... 210/169 |
| 6,045,706 A | 4/2000 | Morrison et al. ........... 210/696 |

OTHER PUBLICATIONS

Communication/ *Notification of Transmittal of the International Search Report* of Apr. 23, 2003.

* cited by examiner

*Primary Examiner*—Kevin Lee
(74) *Attorney, Agent, or Firm*—Wiggin & Dana LLP; William A. Simons; Anthony Gangemi

(57) ABSTRACT

A feeder that uses a local elevation or stationary wave of a body of water to facilitate the dissolving of a chlorine-containing water treatment chemical.

32 Claims, 20 Drawing Sheets

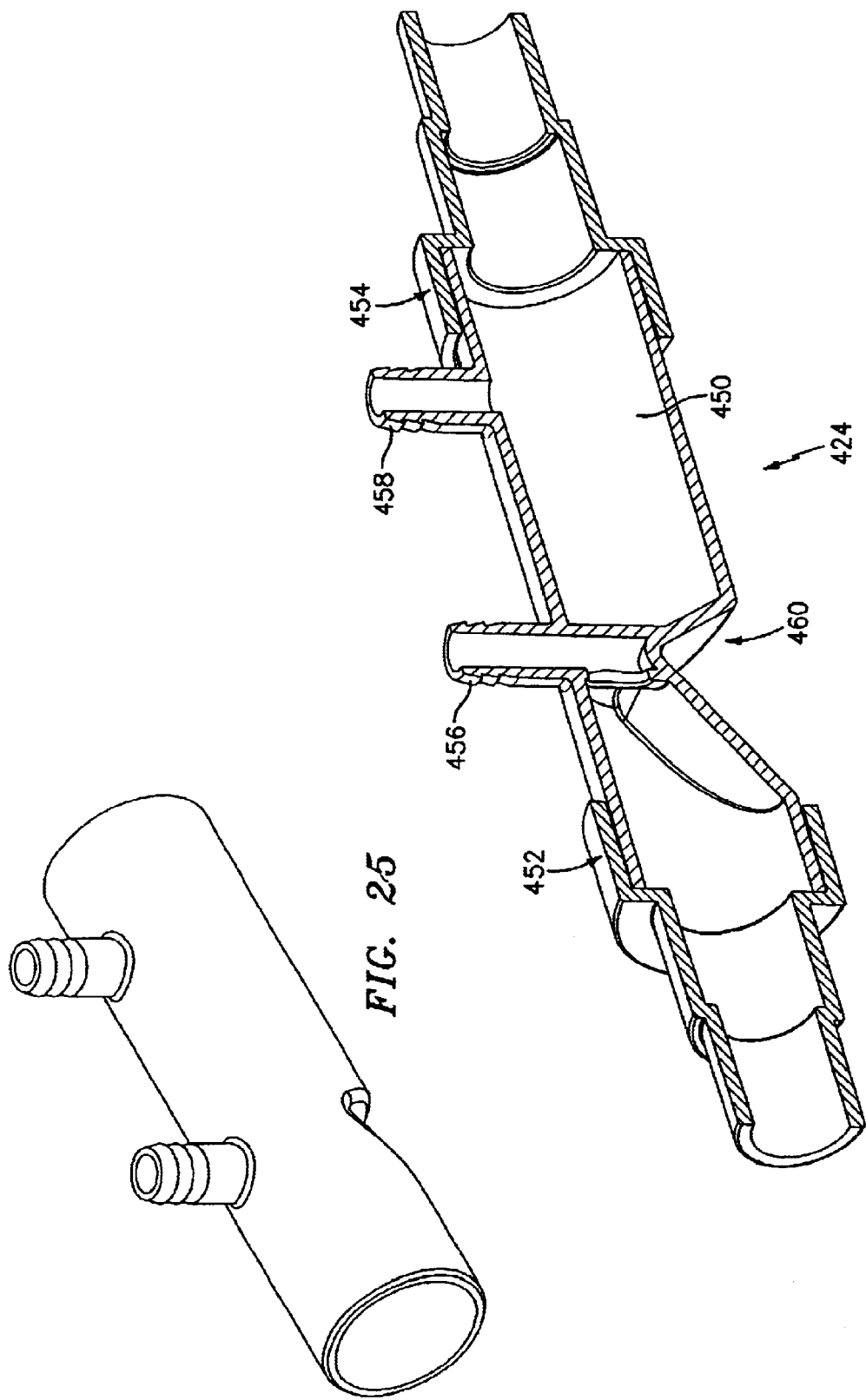

CHEMICAL FEEDER

CROSS-REFERENCE TO RELATED APPLICATION

This patent application relates to the subject matter of U.S. Provisional Patent Application Ser. No. 60/338,386 entitled "Chemical Feeder" that was filed on Dec. 4, 2001, and U.S. Provisional Patent Application Ser. No. 60/392,727 entitled "Chemical Feeder" that was filed on Jun. 27, 2002. The disclosures of both of these U.S. Provisional Applications are incorporated by reference in its entirety herein as if set forth at length.

BACKGROUND OF THE INVENTION (1) Field of the Invention

This invention relates to water treatment, and more particularly to feeders for introducing treatment chemicals into a recirculating water stream from a swimming pool or the like.

(2) Brief Description of the Art

If untreated, swimming pool water provides an hospitable forum for the growth of bacteria, algae, and other undesirable and potentially unhealthful organisms. It, accordingly, has become common practice to treat pool water on both periodic and continuous bases with treatment chemicals to kill/control such organisms.

Such treatment is typically undertaken via the introduction of chlorine into the pool water at levels effective to kill or control the unwanted organisms. The chlorine source may be in liquid form or may be in a solid form which is then dissolved in the pool water. Among solid sources of chlorine are calcium hypochlorite (cal hypo), dichloroisocyanuric acid (dichlor), and trichloroisocyanuric acid (trichlor).

A variety of feeders exist to deliver chlorine from solid chemical tablets and the like. It is known to utilize a floating erosion dispenser, also known as a "floater" or "feeder", to provide a continuous release of the chemical. The floater contains the solid chemical and provides a controlled exposure of the chemical to the pool water which in turn controls the speed with which the water erodes the solid chemical to introduce chlorine to the pool water. Exemplary floaters are disclosed in U.S. Pat. No. 4,917,868 and U.S. Design Pat. Nos. 297,857 and 309,493. It is also known to pump pool water through an external feeder which may be incorporated in a circulation system that also provides filtering of the pool water. Among such systems are intermittent spray systems, erosion systems, and partial periodic immersion systems. Examples of such systems are shown in U.S. Pat. Nos. 5,932,093, 5,928,608, 5,441,711, 5,427,748, 5,419,355, 5,384,102, 5,133,381, and 4,208,376, and U.S. Reissue Pat. No. 33,861. As additional background, U.S. Pat. Nos. 5,112,521 and 5,004,549 disclose various solid calcium hypochlorite compositions.

Obtaining proper dissolution of the treatment chemical and avoiding undesirable deposits or residues have posed problems in feeder design. Particular problems exist with the use of commercial calcium hypochlorite pellets which produce calcium carbonate deposits. See e.g., U.S. Pat. No. 6,045,706.

BRIEF SUMMARY OF THE INVENTION

One aspect of the present invention is directed to a feeder device for introducing a chemical into a flow of water comprising: a feeder inlet and a feeder outlet; a reservoir of the chemical in solid form and having a foraminate lower portion; a first conduit having an outlet and in communication with the feeder inlet in at least a first feeder condition, maintaining a body of water in which said conduit outlet is immersed; and an outlet chamber which in at least said first feeder condition receives overflow containing the dissolved chemical from the body and is in communication with the feeder outlet.

Another aspect of the present invention is directed to a feeder device for introducing a chemical into a flow of water comprising: a feeder inlet and a feeder outlet; a reservoir of the chemical in solid form and having a foraminate lower portion; a first conduit having an outlet and in communication with the feeder inlet in at least a first feeder condition; means for maintaining a body of water in which said conduit outlet is immersed in at least said first feeder condition; means for altering flow through the conduit to locally elevate a surface of said body between: a first level in said first feeder condition in which the body contacts the chemical in the reservoir so as to dissolve such chemical; a second level in a second feeder condition in which the body does not contact the chemical in the reservoir; and means for, in at least said first feeder condition, directing flow containing the dissolved chemical from the body to the feeder outlet.

Still another aspect of the present invention is directed to a device for introducing chlorine from a chlorine-containing pool treatment chemical into a flow of water to/from a swimming pool comprising: a feeder inlet receiving water from the flow; a reservoir of the chemical in solid form and having a foraminate lower portion; a first conduit having an outlet and in communication with the feeder inlet in at least a first feeder condition; a wall surrounding the conduit outlet and extending upward thereof and, in at least said first feeder condition, maintains a body of water in which said conduit outlet is immersed, the first conduit in said first feeder condition discharging water through the conduit outlet at a rate and speed effective to locally elevate a first surface portion of the body by a height of between 0.125 inch and 1.0 inch above another surface portion of the body so that the first surface portion contacts the chemical to dissolve the chemical; an outlet chamber which in at least said first feeder condition receives said dissolved chemical; and a feeder outlet returning said dissolved chemical to the flow.

And still another aspect of the present invention is directed to a method for introducing a treatment chemical into a body of water at a controlled rate comprising the acts of: providing a feeder having an inlet, an outlet, and containing a solid chemical in a chemical reservoir; causing a flow of water from the body to enter the feeder through the inlet and exit through the outlet to return to the body so as to run the feeder in at least a steady state first condition wherein: at least a first portion of the flow is directed through a conduit outlet into a first body of water so as to produce at least one local elevation of a portion of a surface of that first body, the local elevation contacting a foraminate lower portion of a reservoir of said treatment chemical in solid form so as to dissolve said treatment chemical; and said dissolved treatment chemical is directed to said outlet; and restricting at least said first flow portion so as to disengage the first body of water from the reservoir and cause the feeder to enter at least a steady state second condition.

And yet another aspect of the present invention is directed to a chemical container in a condition installed on a receptacle of a chemical feeder and, comprising: said chemical, comprising in major part calcium hypochlorite; a molded plastic body containing the chemical and having: an open lower end; a closed upper end; and an externally-threaded portion proximate the lower end in threaded engagement to a complementary internally-threaded portion of the receptacle; and a foraminate cover extending across the container mouth and at least partially supporting the chemical and having a central portion immersed in a locally elevated central portion of a body of water.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 24 and 25 are views of first and second manifolds useful in the circulation system of FIG. 22.

Like reference numbers and designations in the various drawings indicate like elements.

DETAILED DESCRIPTION

Figure 1:
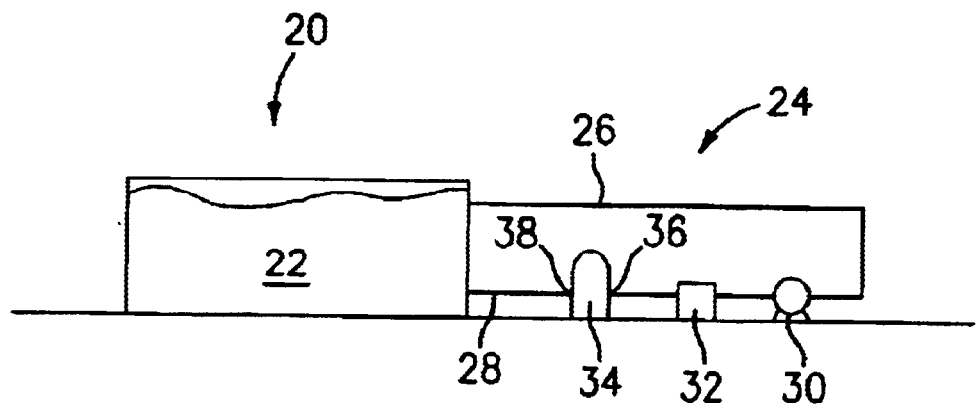
FIG. 1 is a diagram of an exemplary pool circulation system.

FIG. 1 shows a pool 20 containing a body 22 of pool water and associated with a circulation system 24. The exemplary pool is of the above-ground type although this should not be regarded as limiting. The circulation system has a pool outlet conduit 26 drawing water from the pool and a pool return conduit 28 returning water to the pool. Flow through these conduits is induced by a pump 30 with a low pressure (suction) side toward the pool outlet conduit and a high pressure side toward the pool return conduit. Downstream of the pump, there may be a system filter 32 filtering debris and the like from water flowing from the pump and a feeder or chlorinator 34 introducing chlorine to the flow. The feeder has an inlet and an outlet respectively shown as 36 and 38. Alternatively, a manifold may be used in line instead of feeder 34. In that case, a feeder or chlorinator 34 would be connected to the manifold in an off-line fashion.

Figure 2:
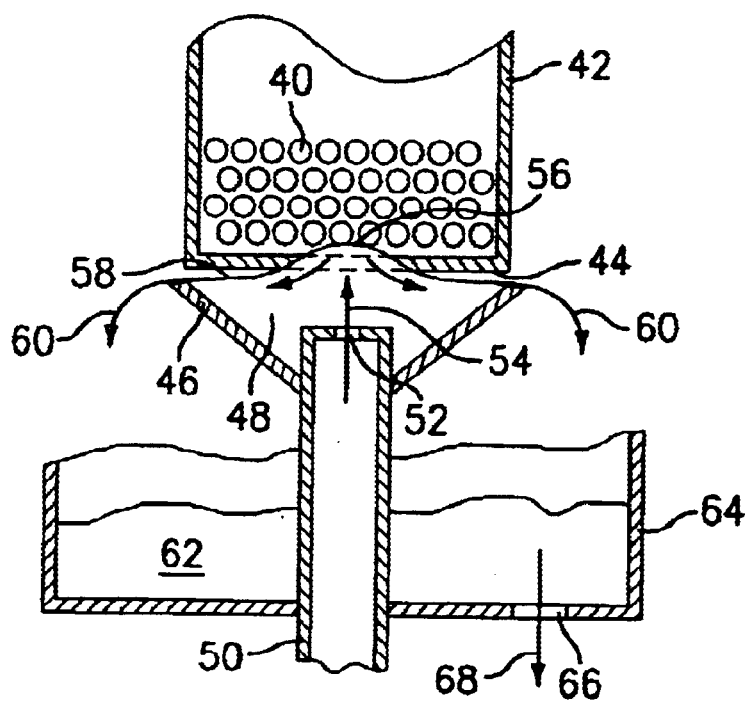
FIG. 2 is a partial semi-schematic sectional view of a chlorinating section of a feeder.

FIG. 2 semi-schematically shows an example of certain aspects of the inventive feeders. Within a feeder, a solid water treatment chemical 40 is contained within a reservoir 42 having a foraminate lower portion 44. The reservoir is above a wall structure or portion thereof 46 which contains a body of water 48. The water enters the body 48 through a conduit 50 having an outlet or nozzle 52. The outlet or nozzle 52 is immersed in the body 48. The outlet 52 is sized so that the water 54 flowing therethrough has a velocity sufficient to produce a substantial local elevation or central stationary wave 56 in the surface of the water in the body. The elevation or stationary wave 56 is high enough to penetrate the foraminate portion 44 and contact the chemical 40. This contact permits dissolving of the chemical which enters the body 48.

Advantageously, a peripheral portion 58 of the surface of the body is at a substantially lower level than the elevation 56, a level below the foraminate portion 44. The level of portion 58 may be slightly above the level of a rim of the wall structure 46 or of discrete drain apertures therein because of surface tension of the body of water. Overflow 60 from the body is over such a rim or through such drain apertures and maybe into a second body 62 contained, for example, by a wall structure 64 surrounding the conduit 50. A drain aperture 66 may pass a drain flow 68 of water containing dissolved chemical which, in turn, may be directed to a feeder outlet or may itself form the feeder outlet. The drain aperture is advantageously located proximate the lowest portion of the second body of water 62 to permit substantially full draining of such body.

When the feeder is turned off (such as via blocking flow through the conduit 50), the wall structure 46 may, subject to evaporation, retain the water body 48 and keep outlet 52 covered. However, lacking the flow 54, there will be no elevation 56 and the chemical 40 will be completely disengaged from the body 48. Although an additional drain (e.g., a very small aperture) may be provided in the wall structure 46 to drain the water body 48 in the "off" condition, advantageously there is no such drain. Maintenance of the body 48 during an "off" interval is advantageous to minimize disturbance upon restart. Specifically, in the absence of the water body 48, unless other steps are taken, upon restart, the flow 54 would constitute a jet fired directly into the foraminate portion 44 and chemical 40, disturbing the chemical and causing a very high initial dissolution rate. Advantageously, the depth of the outlet 52 below the surface of the body 48 in the off condition is effective to damp such a jet so that, when the feeder flow is restarted, the elevated portion is more gently reformed in a wave or elevated portion fashion.

Figure 3:
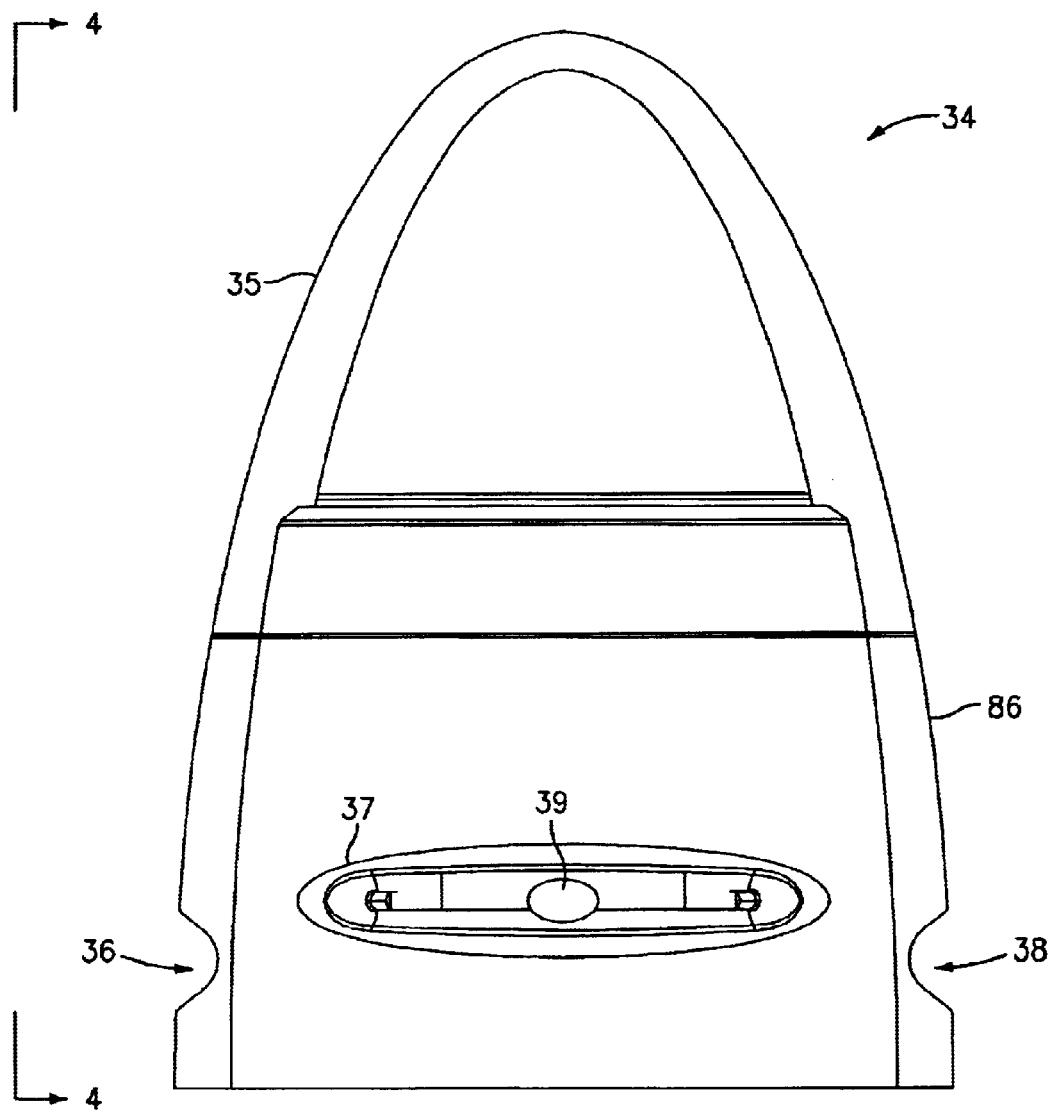
FIG. 3 is a front view of a feeder.
Figure 4:
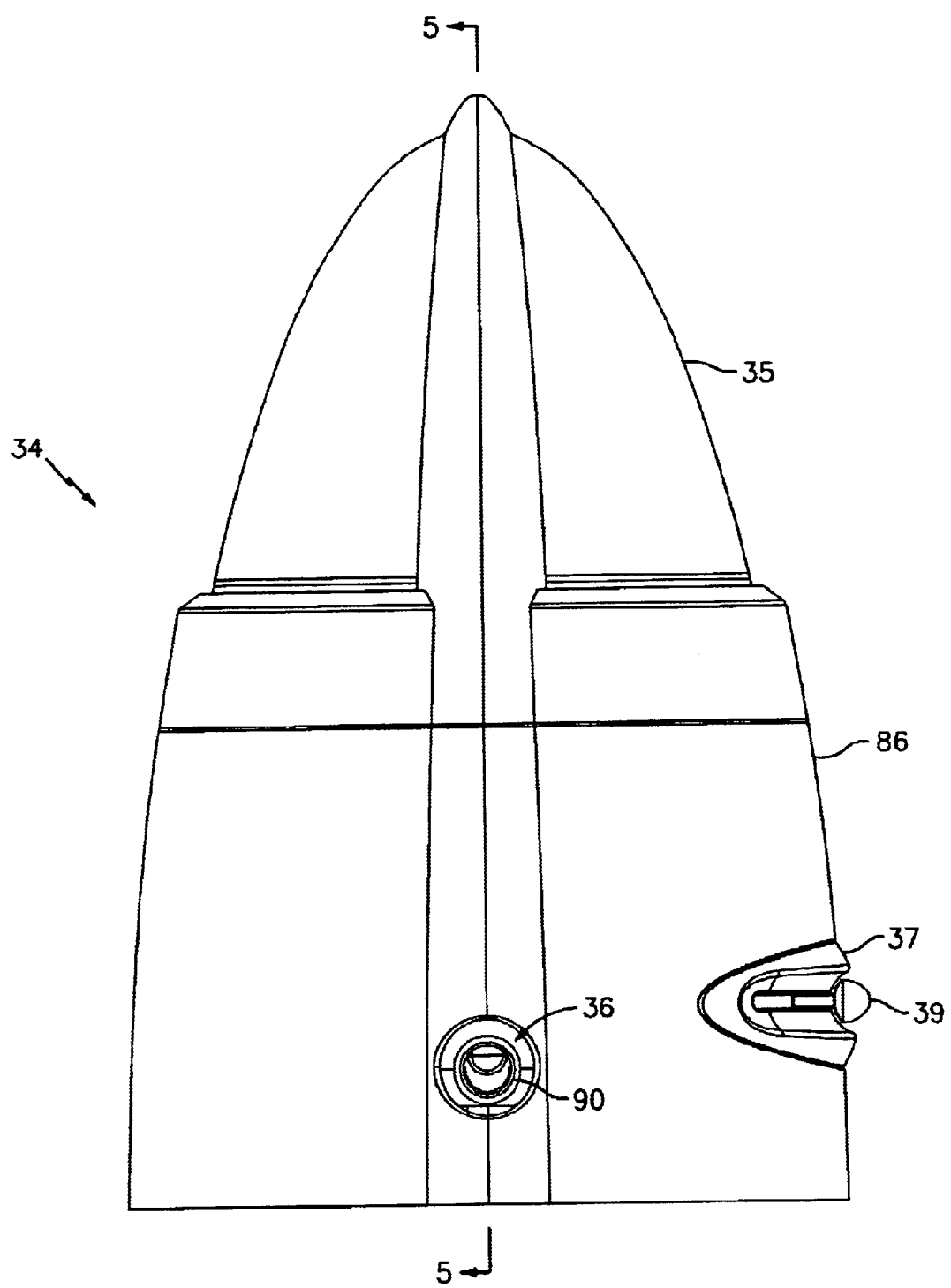
FIG. 4 is a side view of the feeder of FIG. 3.
Figure 5:
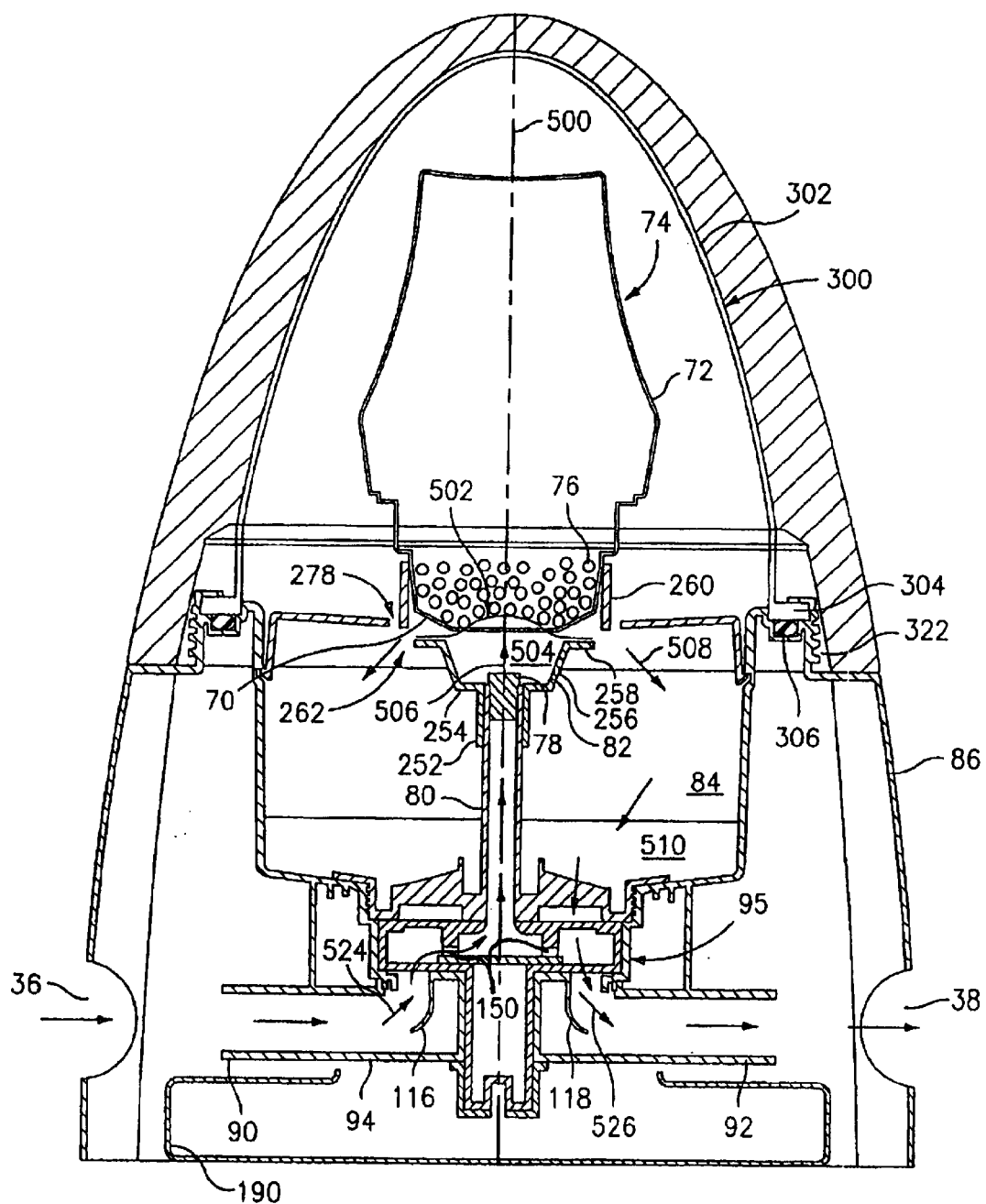
FIG. 5 is a vertical sectional view of the feeder of FIG. 4.

FIGS. 3–5 show greater details of an embodiment of the feeder 34. In FIGS. 3 and 4, the upper chlorinating section 35 and the lower body portion or base 86 of the feeder, a flow controller opening 37 including a control nob 39 adjusts the water flow through the feeder from an off/drain position to a maximum flow rate. Feeder water flow inlet 36 and water flow outlet 38 are also shown. In FIG. 5, the exemplary feeder has a central vertical axis 500 and is shown in an on condition. In the upper chlorination section of the feeder, a central elevation 502 of the surface of a dissolving body of water 504 penetrates a foraminate cover 70 secured about the mouth of a body 72 of a reservoir container 74 containing chemical 76. Exemplary chemical briquettes are 65% by weight calcium hypochlorite available from Arch Chemicals, Inc., Charleston, Tenn. and weigh approximately 7 grams apiece and are 32 mm long, 19 mm wide, and 13 mm thick.

Immersed within the body 504 is a flat fan nozzle 78 which expels an outlet flow 506. By way of size reference, the nozzle may have dimensions effective to carry a water flow rate of between 0.2 and 2 gpm at a pressure of 5 psi notwithstanding that the feeder may or may not actually be operated at such specific pressure. An exemplary nozzle is 50° flat fan available from Lechler, Inc. of St. Charles, Ill. as model 632.884.5E.BC. The nozzle 78 is secured to the upper end of a conduit 80 as is a wall structure 82 containing the body 504. Alternatively, the nozzle may be molded into the upper end of conduit 80 and is the same material as conduit 80. Overflow 508 from the body 504 falls into an outlet chamber 84 within a lower body portion or base 86 of the feeder.

The exemplary base comprises a principal member formed, for example, as a unitary molding of a polymer (e.g. polycarbonate). In the bottom of the outlet chamber is a second or outlet body of water 510 surrounding the conduit 80.

The feeder inlet and outlet 36 and 38 are respectively associated with first and second end portions 90 and 92 of a manifold 94. These exemplary end portions are tubular for mating with the conduits of the circulation system. As is described in greater detail below, the manifold serves to receive inlet water, direct at least a portion of such inlet water toward the chlorinating section of the feeder, receive chlorinated water from the chlorinating section, and outlet the chlorinated water toward the pool. Interposed between the manifold on the one hand and the conduit 80 and outlet chamber 84 on the other hand is a valve structure 95 governing the flows up into the conduit and down from the outlet chamber.

Figure 6:
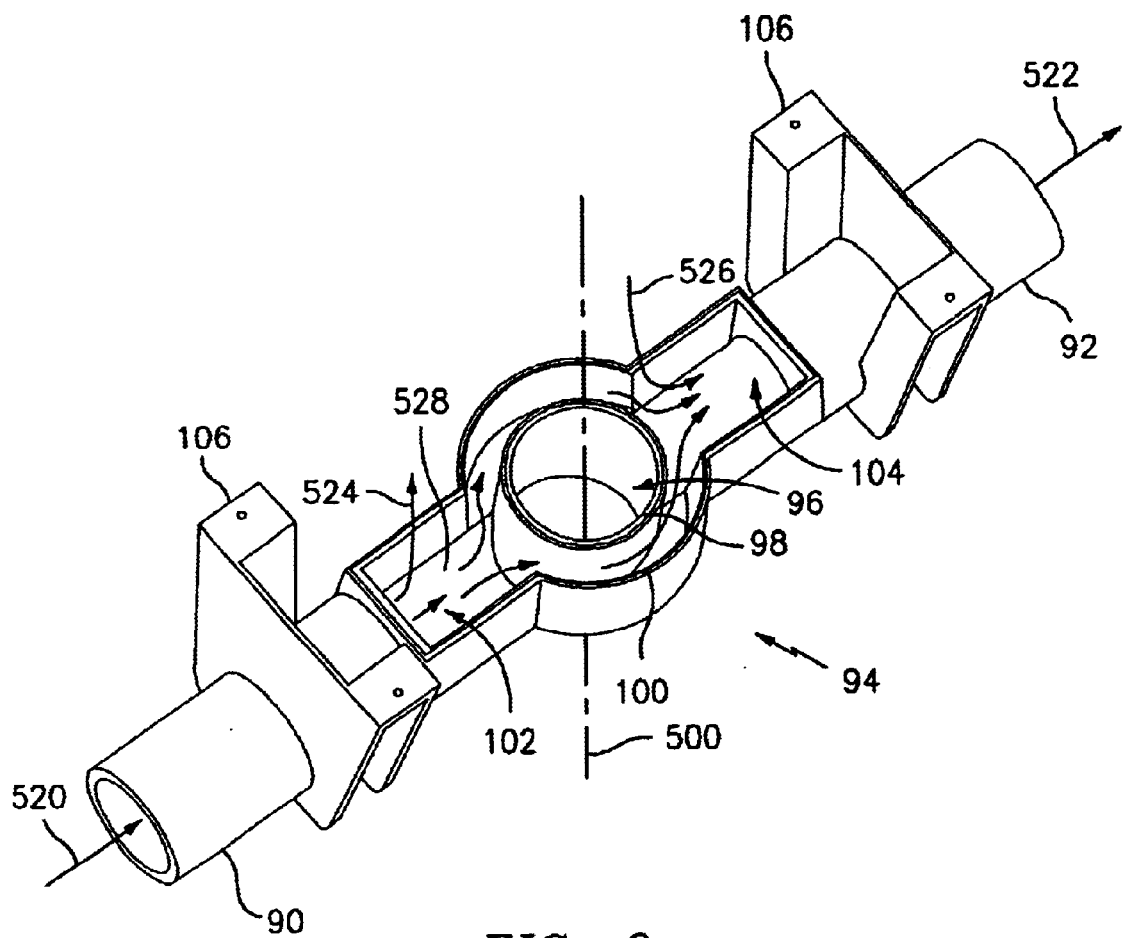
FIGS. 6 and 7 are views of a manifold of the feeder of FIG. 3.
Figure 7:
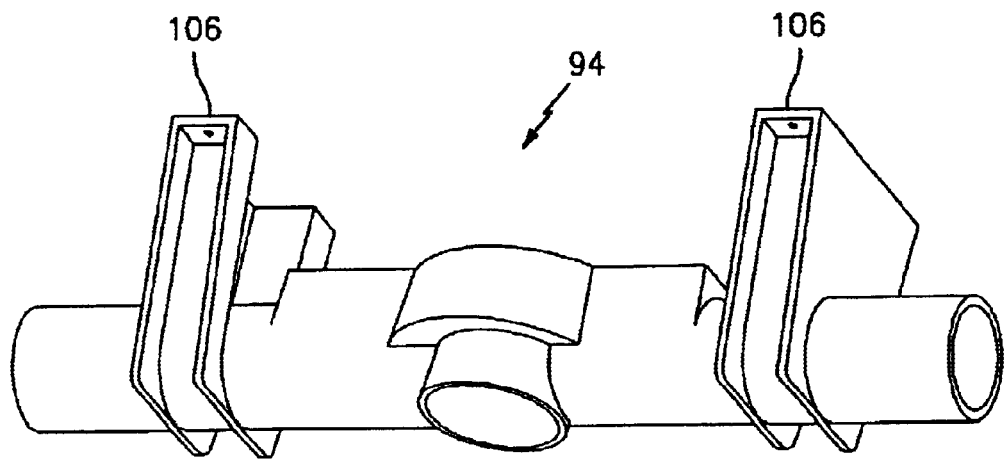

The manifold (FIGS. 6 and 7) is formed with a central, vertically extending tubular wall 98 which bounds a central aperture 96 about the axis 500. The aperture 96 permits passage of a valve actuation shaft as described below. An outer wall 100 of the manifold is spaced apart from the inner wall 98 allowing communication from the inlet to the outlet through the spaces between the walls 98 and 100. The manifold includes a pair of upwardly open areas 102 and 104 respectively toward the inlet and outlet sides from the central axis and wall 98. These open areas permit a diversion of a portion of the water flowing through the feeder to/from the chlorinating section. In an exemplary embodiment, feeder inlet and outlet flows 520 and 522 are identical and in the vicinity of 20–40 gallons per minute (gpm). The diverted flows 524 and 526 to/from the chlorinating section may be in the vicinity of 0.2–0.6 gpm, with a bypass flow, 528 passing between the walls 98 and 100 so as to bypass the chlorinating section, accounting for the difference.

Figure 8:
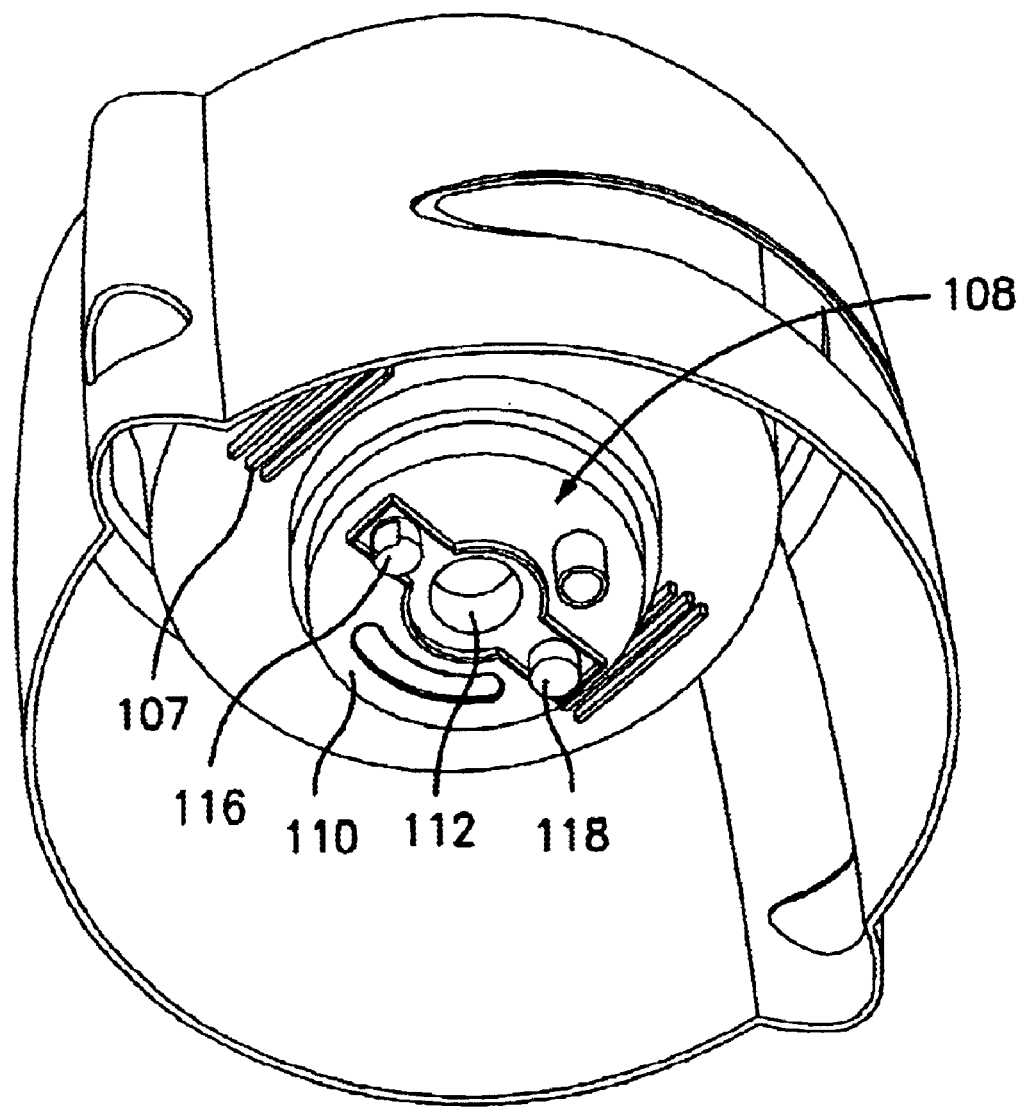
FIG. 8 is a view of an underside of a base of the feeder of FIG. 3.

The exemplary manifold is molded from a polymer such as polycarbonate. The exemplary manifold is molded with a pair of mounting brackets 106 extending upward from the respective inlet and outlet tubular portions and having upper surfaces for engaging an underside of the base 86 to which it may be secured such as via ultrasonic welding. The mating portion of the base underside (FIG. 8) comprises two sets of mounting ribs 107 on a portion of the base defining a bottom wall of the outlet chamber. Between these is a depressed generally cylindrical valve element compartment 108. At the bottom of the compartment is a central generally horizontal web 110 having an aperture 112 of similar size to the manifold aperture 96 of FIG. 6. When assembled, the rim of the wall 98 is sealingly secured to the web 110 to align the apertures 96 and 112. The wall 100 and continuations thereof surrounding the open areas 102 and 104 are similarly sealingly secured to the web. A pair of inlet and outlet scoops 116 and 118 (FIGS. 5 and 8) depend from the web and penetrate the manifold open areas when assembled. The scoops 116 and 118 guide the respective flows 524 and 526 (FIG. 5) upward through the web from the manifold inlet 90 and downward through the web to the manifold outlet 92, respectively.

Figure 9:
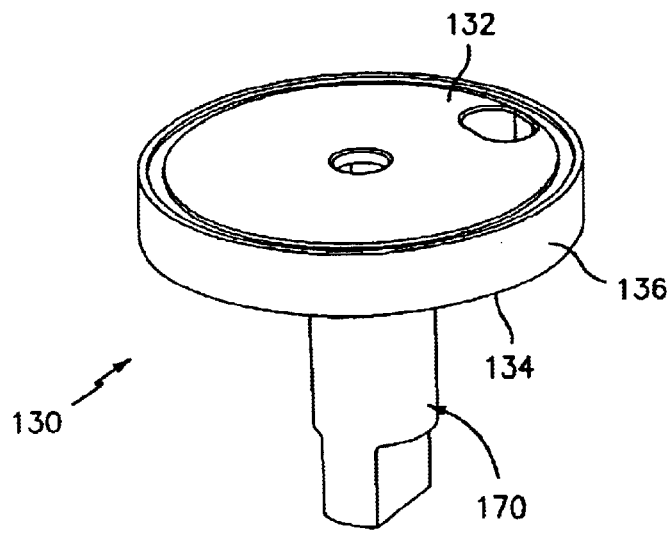
FIG. 9 is a view of a valve element of the feeder of FIG. 3.
Figure 10:
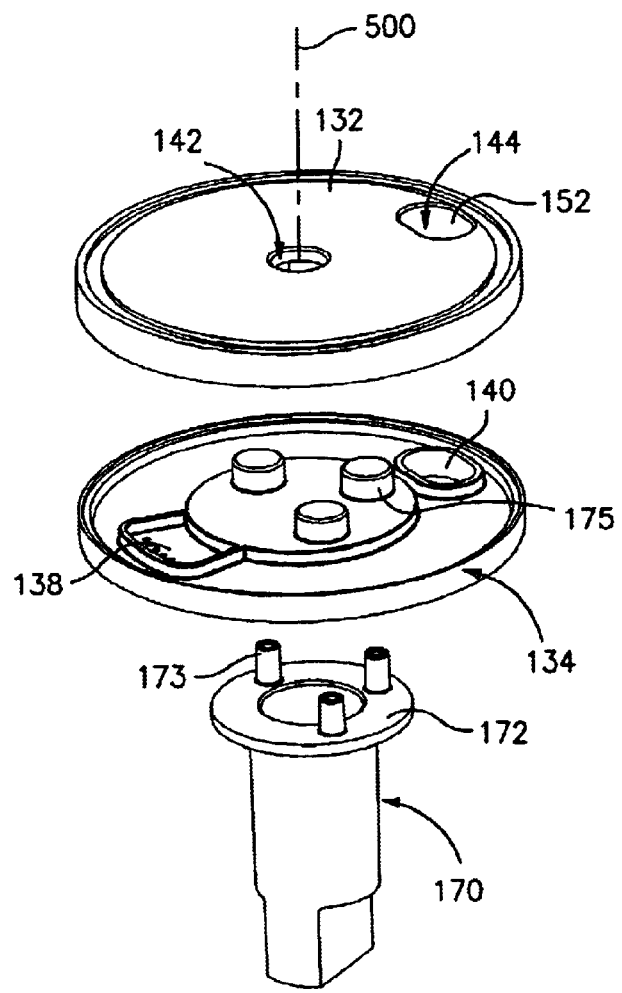
FIG. 10 is an exploded view of the valve element of FIG. 9.
Figure 11:
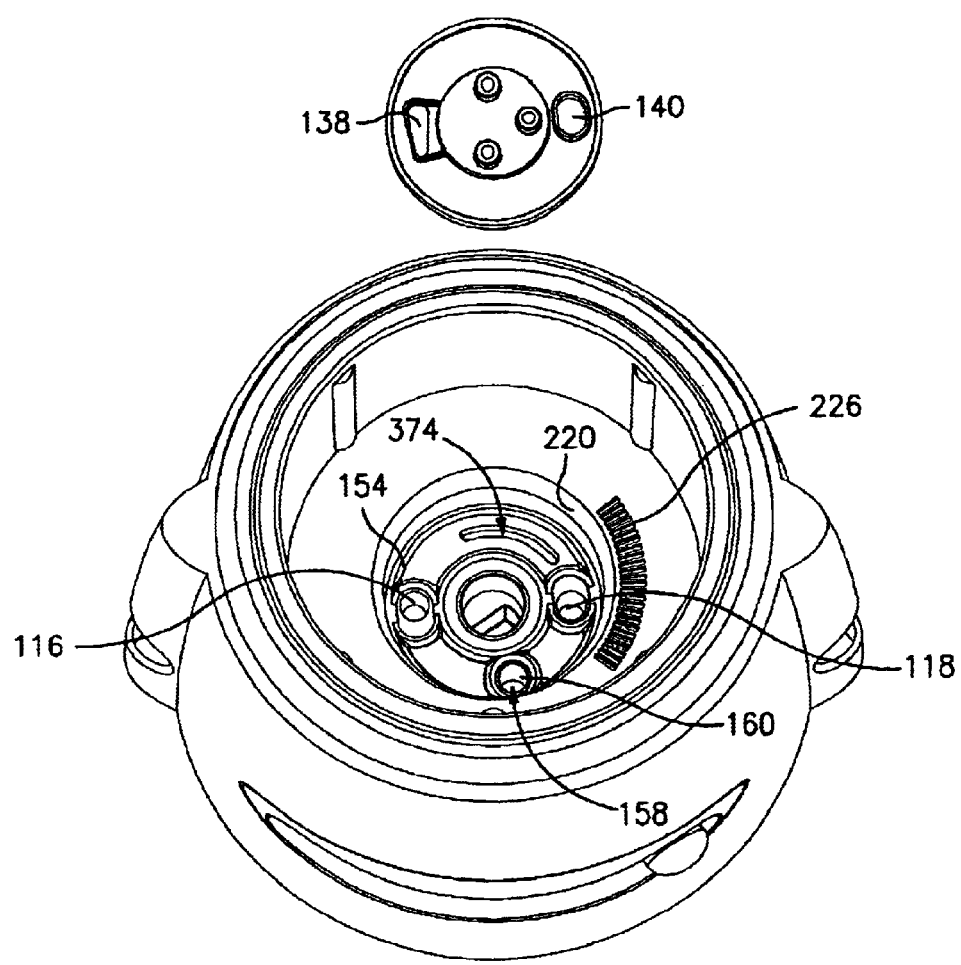
FIG. 11 is a view of a discharge chamber in the base of the feeder of FIG. 3.

In the exemplary embodiment, the flows 524 and 526 proceed respectively from/to the chlorinating section through the valve structure 95. The valve structure includes a valve element 130 (FIGS. 9 and 10) generally including a hollow cylindrical portion formed by upper and lower flanges 132 and 134, which, when joined together, form sidewall 136. In the exemplary embodiment, the upper flange 132 is unitarily molded of a polymer such as low density polyethylene (LDPE) while the lower flange 134 is similarly molded (e.g., of LDPE) and sealingly secured together via hot plate welding. The valve element is formed having first and second ports 138 and 140 (FIG. 10) in the lower flange and first and second ports 142 and 144 in the upper flange. The first port 142 in the upper flange is centrally located and aligned with a lower inlet port 150 (FIG. 5) to the conduit 80. The first port 138 in the lower flange is spaced apart from the axis 500 so that, with the valve in an on orientation, it is aligned with the inlet scoop to receive an inlet flow. The first ports of the lower and upper flanges are in closed communication with each other via the valve element interior. The second ports of the lower and upper flanges are spaced apart from the axis 500, diametrically opposite the first port of the lower flange. The second ports are in closed communication with each other through a sleeve portion 152 depending from the upper flange. In the "on" orientations associated with the "on" conditions, the second ports are at least partially aligned with the outlet scoop 118 to permit flow 526 through such second ports and scoop. Likewise, the lower flange first port is similarly aligned with the inlet scoop 116 to permit the flow 524. Accordingly, the lower flange first and second ports respectively serve as inlet and outlet ports for the valve element and the scoops 116 and 118 serve as inlet and outlet ports for the chlorinating section above. A gasket 154 (FIG. 11) seals the lower flange to the upper surface of the body web. The gasket includes inner and outer concentric portions and portions therebetween aligned with the scoops and with a drain aperture or port 158 in the web from which a sleeve 160 depends (described in further detail below).

Figure 12:
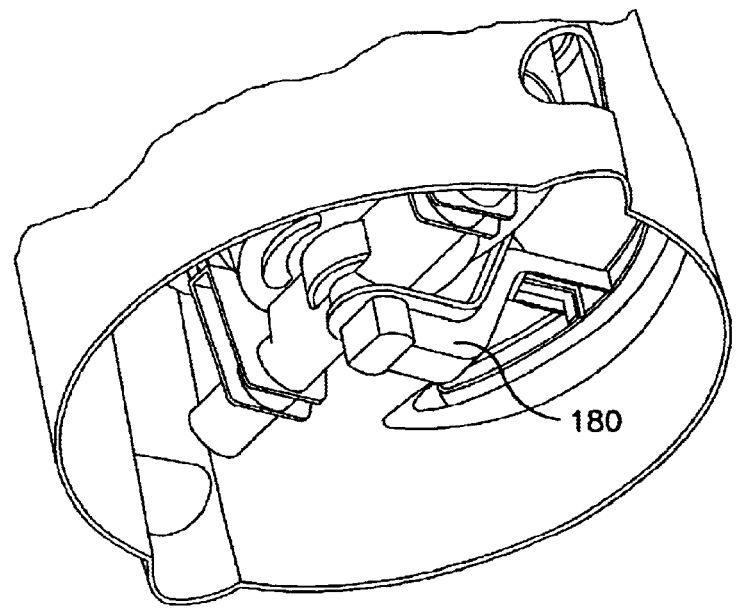
FIG. 12 is a view of the underside of the feeder of FIG. 3.

An actuation shaft 170 (FIGS. 9 and 10) depends from the valve element and is secured thereto so as to control rotation of the valve element. The exemplary shaft 170 (FIG. 10) has an upper mounting flange 172 for mating with the valve element lower flange 134. To prevent relative rotation, a plurality of posts 173 ascends upward from the mounting flange and is received by complementary sockets 175 in the valve element lower flange 134. At its lower end, the shaft includes a faceted portion or other feature for engaging a complementary feature of a proximal end of a lever or control arm 180 (FIG. 12). The shaft passes through the central manifold aperture. User movement of a knob at the distal end of the lever 180 causes the valve element to rotate about the axis 500 through a plurality of orientations. As noted above, in a series of "on" orientations, the ports 138 and 140 are aligned with the scoops 116 and 118. The degree of alignment can provide a flow rate adjustment as a partial overlap of the ports 138 and 140 with respect to scoops 116 and 118 provides a somewhat restricted flow. In the exemplary embodiment, the outlet port 140 is relatively elongate in the radial direction as a generally curved obround. The inlet port 138 is a series of small holes to provide that, in the restricted conditions, the inlet flow is more restricted than is the outlet flow to avoid undesirable accumulation of water. In making this series of holes, sensitivity is decreased, making it easier for the user to adjust the flow through the chlorinating section and, thereby, the feed rate. In yet another orientation, an "off/drain" orientation, the port 140 is aligned with the drain sleeve 160 and the port 138 is completely blocked by the web. In this condition, there is substantially no flow through the scoops 116 and 118. Rather, the drain flow may pass through the valve element and through the sleeve 160 and into a drain pan 190 (FIG. 5).

Figure 17:
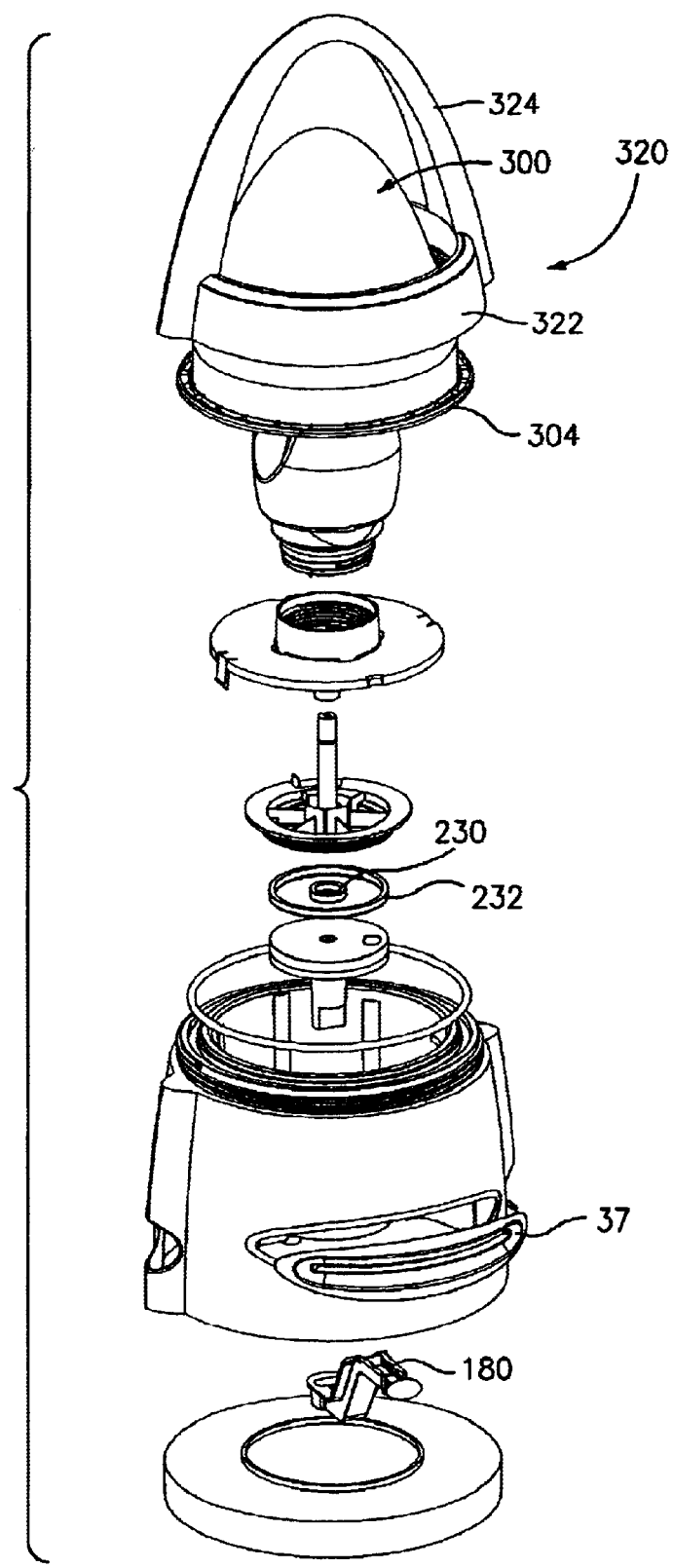
FIG. 17 is an exploded view of the feeder of FIG. 3.

Above the valve element, the exemplary conduit 80 (FIG. 13) is principally formed by a tubular portion or tube 200 of a unitarily molded structure (e.g., of polycarbonate) 202. The exemplary conduit outlet is provided by the nozzle 78 which may be threaded into an internally threaded upper end of the tube 200. At the lower end of the tube, a flange 204 may extend radially outward and may be provided with structural reinforcing ribs 206 and apertures 208 (discussed below). A step in the flange extends vertically upward and has an externally threaded outer portion 212 (FIG. 14). At the top of the portion 212, the flange continues further outward to a rim 214. At at least one point along the rim, the flange is formed with a pawl portion 216 defined by a slot 218 having intersecting radial and circumferential portions. The structure 202 is received in an upper portion of the valve compartment 108 immediately above the valve element. The threaded portion 212 is received by a complementary threaded portion 220 (FIG. 11) formed by a step in the valve compartment wall. Alternatively, the flange 204 may be secured to base 86 by means of plastic (PVC) bolts rather the threaded structure. When assembled, and screwed in place, a barb 224 of the pawl 216 engages one of a plurality of detent indentations 226 in the upper surface of the outlet chamber bottom wall to angularly secure the structure 202 in place. When so secured, the underside of the flange 204 bears against inner and outer o-rings 230 and 232 (FIG. 17) carried in channels in the upper surface of the valve element upper flange (FIG. 14). The o-rings respectively seal inlet and outlet flow paths and the structure is tightened into the valve compartment to a point where one of its apertures 208 is in alignment with the outlet scoop while another is in alignment with the drain sleeve to respectively facilitate outlet and drain flows.

Figure 14:
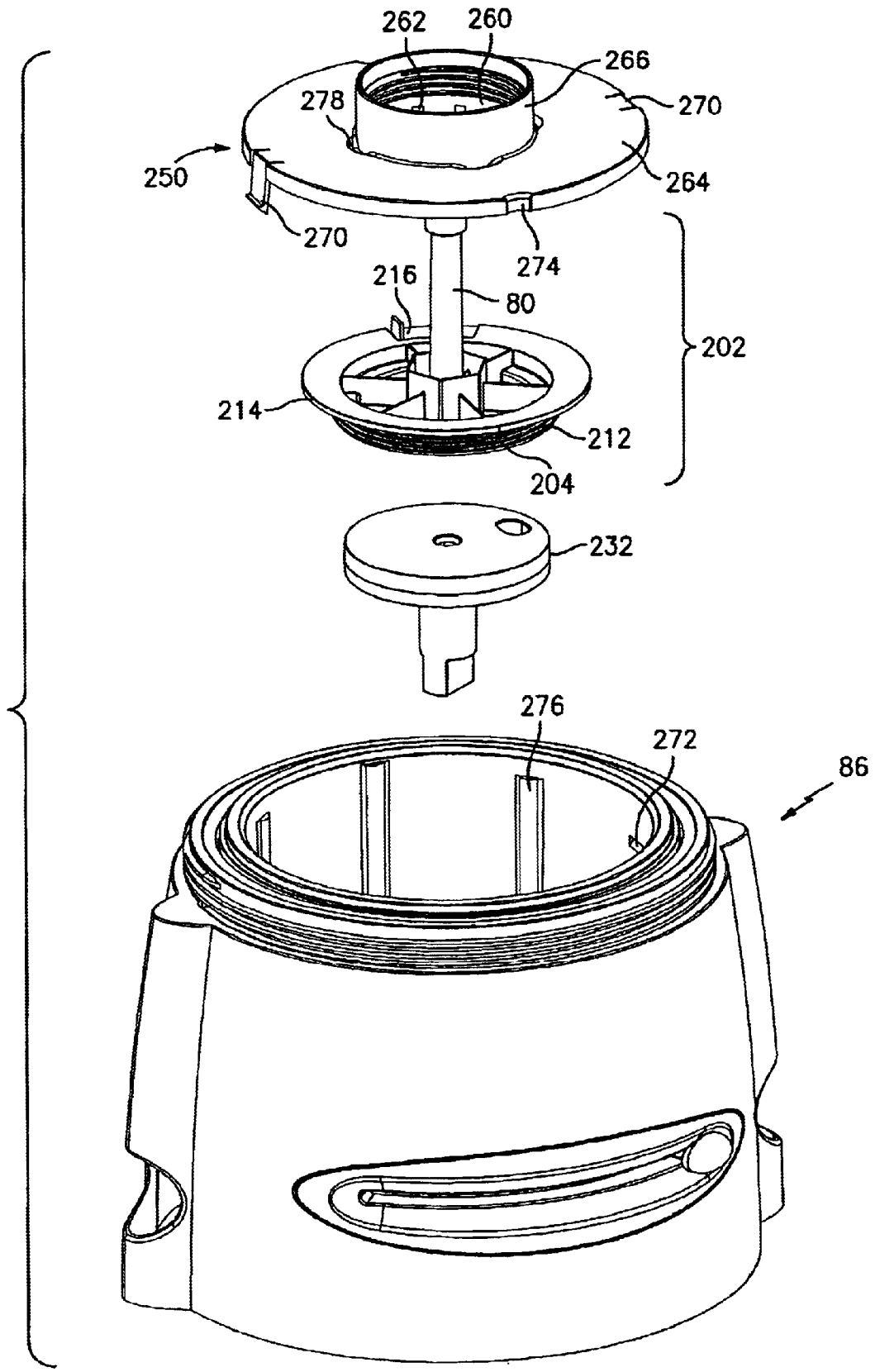
FIG. 14 is an exploded view of a portion of the feeder of FIG. 3.
Figure 15:
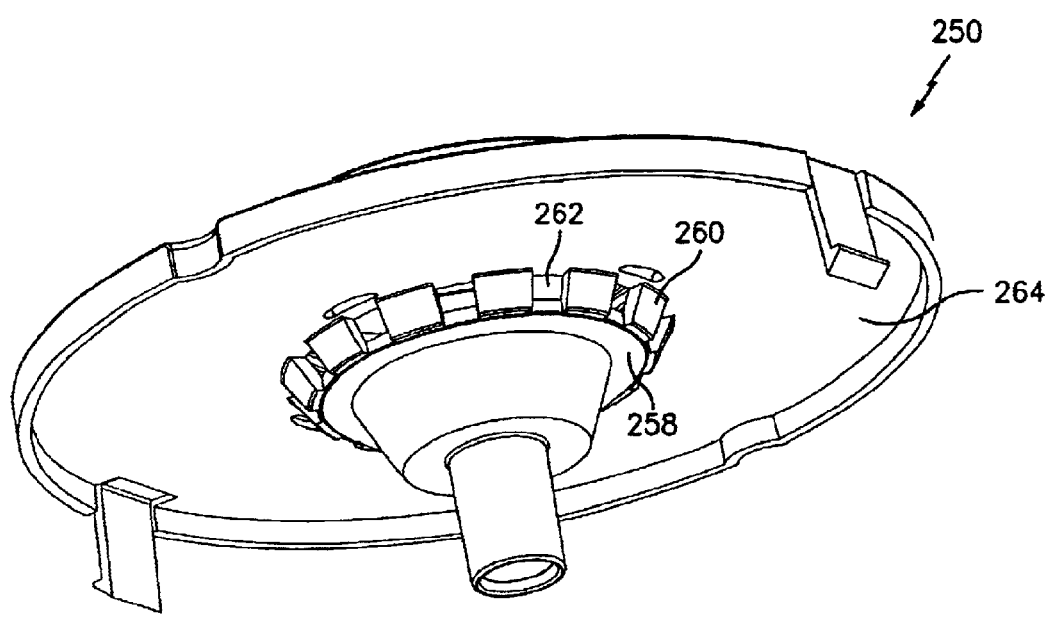
FIG. 15 is a view of the underside of a cover for the base of the feeder of FIG. 3.

In the exemplary embodiment, a molded outlet chamber cover member 250 (FIG. 14) serves multiple functions, including providing, at a central portion, the wall structure 82 (FIG. 5) which defines the dissolving chamber. A central tubular portion 252 of the member lies at the lower end of the wall structure 82 and receives an upper end of the conduit 80 and is sealingly secured thereto via an o-ring riding in a groove in the conduit. The wall structure 82 includes a first flange portion 254 extending radially outward from an upper extreme of the tubular portion 252 and a first frustoconical portion 256 extending upward and radially outward from the upper/outward extreme of the portion 254. A second flange portion 258 extends radially outward from the upper/outward extreme of the portion 256. A second frustoconical portion 260 extends upward and outward from the outward end of the portion 258. The exemplary portion 260 has a plurality of openings 262 permitting overflow from the dissolving chamber to the outlet chamber. At the upper end of the portion 260, an upper flange 264 (FIGS. 14 and 15) extends radially outward and an internally threaded collar portion 266 extends further upward. With the conduit structure 202 installed in the body, the outlet chamber cover member 250 is placed downwardly thereover to install.

In an exemplary two locations along the top flange perimeter, a pair of pawls 270 (*FIG. 14) depend. Projections on the pawls 270 engage complementary indentations 272 in the outlet chamber sidewall. One or more channels 274 in the perimeter of the top flange receive complementary vertical ribs 276 in the outlet chamber sidewall to angularly locate the member 250. Apertures 278 near the base of the collar 266 and root of the top flange 264 permit drainage of any water accumulating on the top flange. The internally threaded collar receives a complementary externally threaded portion of a treatment chemical container serving as a reservoir.

Figure 16:
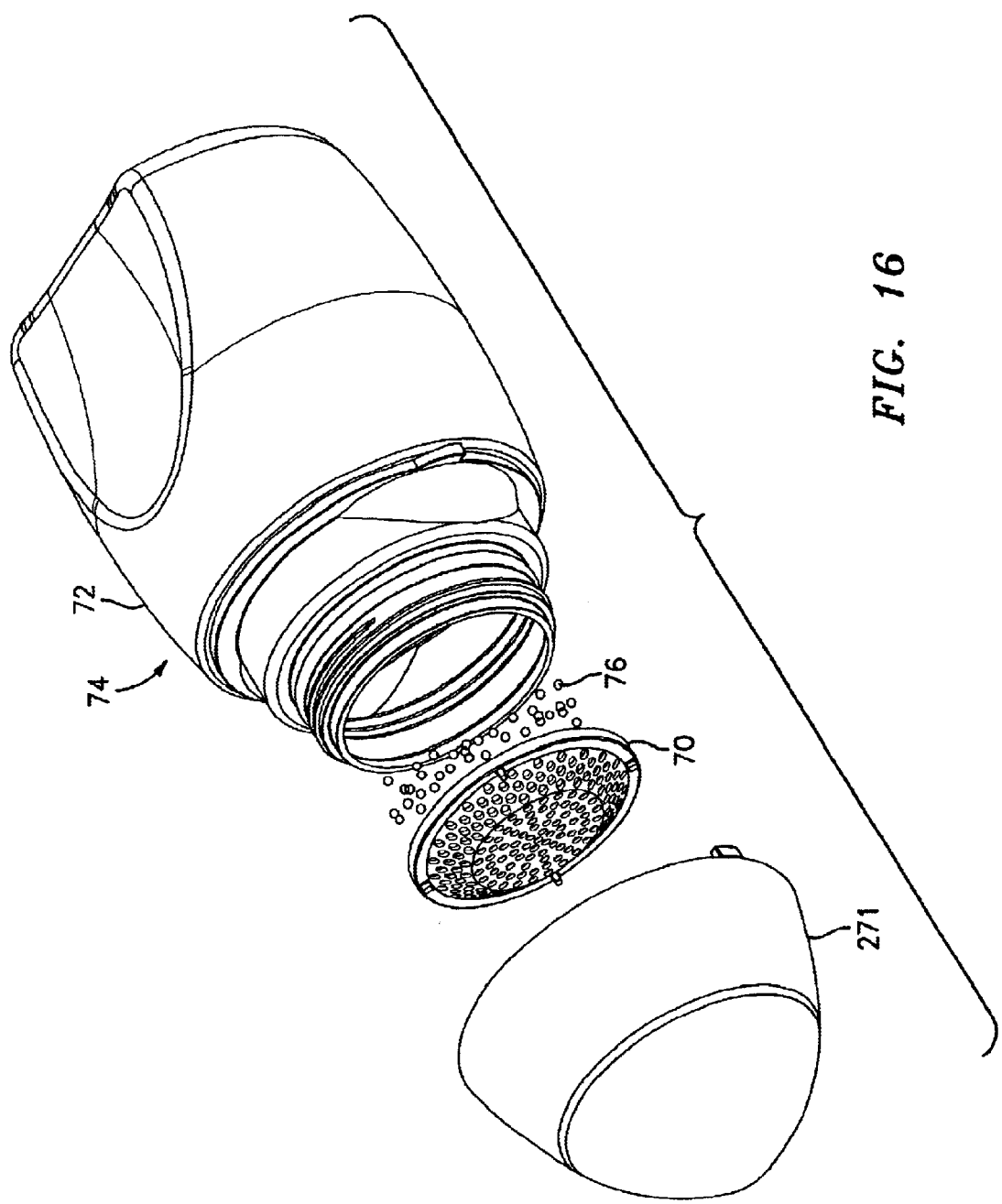
FIG. 16 is an exploded view of a treatment chemical container for the feeder of FIG. 3.

FIG. 16 shows further details of the exemplary container 74 including the foraminate cover 70 (e.g., molded of HDPE), the body 72 (e.g., molded of HDPE), and a shipping/storage cap or cover 271 removed prior to installation of the container on the feeder. The exemplary cover 271 may engage the same external threads on the body 72 used to mount the container to the feeder.

In the exemplary embodiment, the feeder cover 300 (FIG. 5) is secured above the feeder base enclosing the chemical container and sealingly enclosing a headspace of the outlet chamber. The exemplary cover is molded of a plastic material such as polycarbonate and is, advantageously, substantially transparent although it preferably may be tinted. The exemplary cover includes a roughly paraboloid dome 302 terminating in a radially outwardly extending flange 304. An o-ring 306 accommodated within an annular channel in a rim of the feeder base seals the cover to the base. To maintain compressive engagement between the flange 304 and the base, a locking member 320 (FIG. 17) is provided. The exemplary locking member includes a first internally threaded locking ring portion 322 and a handle 324 extending upward from diametrically opposite points on the ring. The exemplary member 320 is unitarily molded of a polymer (e.g., polycarbonate). The ring 322 is dimensioned to fit over the flange 304 with a downward facing internal shoulder of the ring engaging an upper surface of the flange. The ring 322 is screwed onto an externally threaded portion of the base rim outboard of the o-ring 306 to compress the flange 304 against the o-ring. The handle 324 is dimensioned to overarch the dome 302 when so installed.

In operation of the exemplary embodiment, in an "on" condition, a principal flow through the feeder is through the manifold inlet to the manifold outlet without passing through the chlorinating section. A relatively small portion of the inlet flow is diverted by the inlet scoop to the chlorinating section (the exact proportion being user adjustable via rotation of the valve element). The diverted flow proceeds upward through the valve element and conduit into the dissolving chamber and, via the elevation of the surface thereof, into the chemical reservoir. Overflow from the dissolving chamber contains dissolved treatment chemical and proceeds through the apertures 262 to fall into the outlet chamber. The intact portions of the wall 260 between the apertures 262 are believed advantageous to reflect waves with the reflected waves tending to cancel the incident waves. This may provide a more stable surface profile along the elevation with a single central elevation or wave 502 in the body of water 504.

From the outlet chamber, the diverted water flows through the valve element and outlet scoop to rejoin the principal flow exiting the manifold. As chemical in the container is dissolved and depleted, the remaining chemical will fall downward. The closed body of the container will tend to fill with air from the headspace of the outlet chamber in order to fill the space vacated by the descending stack of treatment chemical. As this occurs, the level of water in the outlet chamber will gradually rise correspondingly. By sealing the headspace, and thereby largely conserving the amount of air present, the cover 300 helps prevent the level of water in the outlet chamber from rising too high. The level of water in the outlet chamber is advantageously kept well below the chemical in the container, preferably, at some intermediate height along the conduit 80. In operation, the headspace is maintained at an elevated pressure, e.g., 0–8 psig and, typically 3–4 psig. The body and cover are sufficiently robust to withstand all operating pressures with a margin of safety. Advantageously, this includes withstanding a headspace pressure of up to 10 psig.

The feeder may be placed in the "off" condition, for example, in order to replace the container or simply when it is not desired to add chemical to the flow. To do this, the user simply rotates the valve element to the "off" position. In this position, the entirety of the flow through the inlet port 90 is directed through the outlet port 92 without passing through the chlorinating section. In this condition, the outlet chamber may drain through the valve element into the drain pan 190. The cover locking member 320 may be removed by unscrewing and the cover 300 then removed. At this point, the container 74 may be unscrewed and replaced. The cover 300 and locking member 320 may then be replaced and the feeder returned to a desired "on" condition.

In one minor variation on this system, substantially the entire flow through the feeder may be directed through the chlorinating section in the "on" condition. This may be particularly relevant for use in a setup wherein the feeder is not located in the primary flow path of the circulation system but is located so that only a small diversion of the total flow through the circulation system passes through the feeder.

Figure 18:
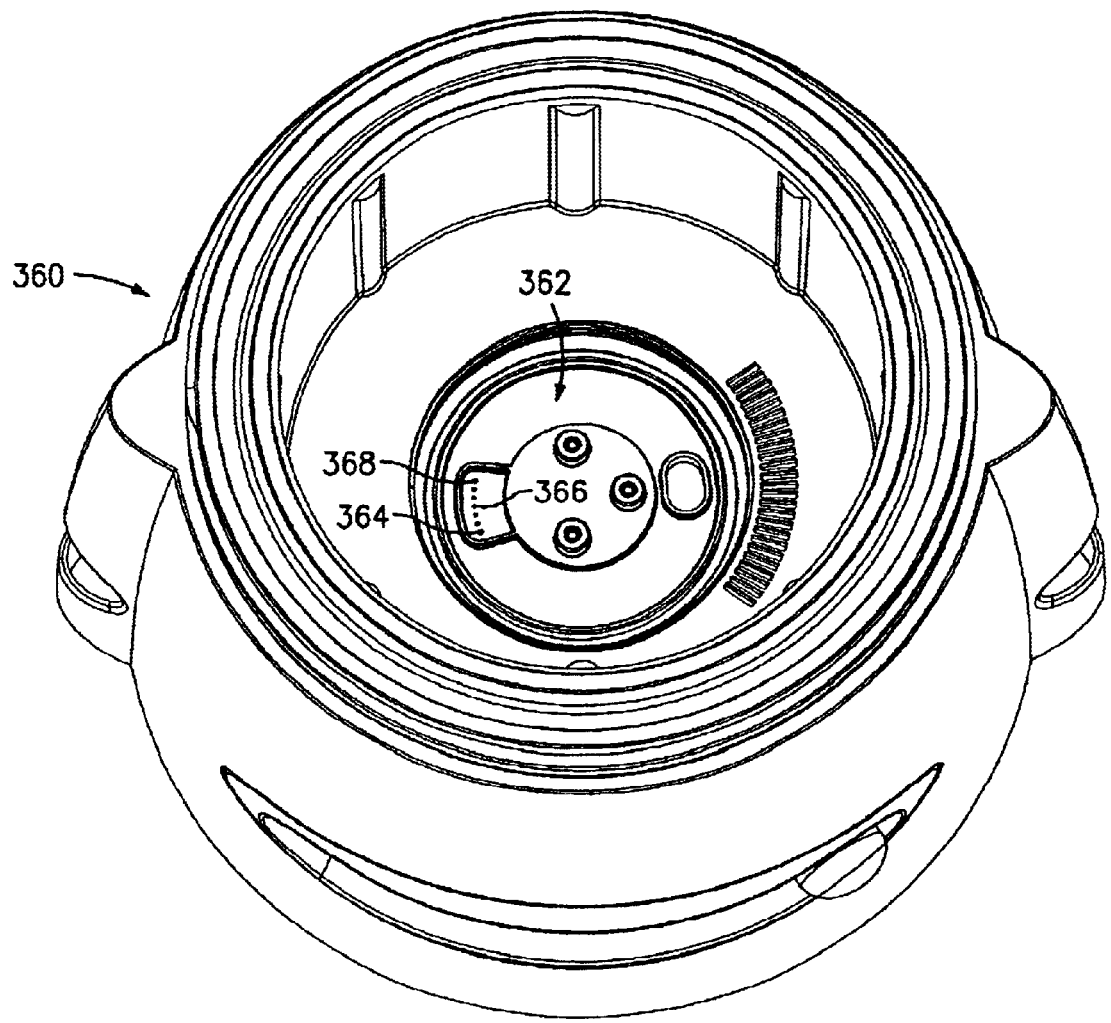
FIG. 18 is a view of an alternate valve element lower flange.

FIG. 18 shows details of an alternate feeder base 360 which may be largely similar to the base 86. As does the base 86, the base 360 may include a valve element. This valve element may differ from element 130 in the construction of its lower flange 362. This lower flange includes an array of apertures serving as its first port. FIG. 18 shows a single approximately circumferential array of apertures extending from a first aperture 364 through a plurality of intermediate apertures 366 to a last aperture 368. In the series of "on" orientations for this valve element, one-to-all of these apertures are brought into alignment with the feeder body inlet port therebelow. In an exemplary implementation, the first aperture 364 is 0.055 inch in diameter and the remaining apertures 366 are 0.033 inch in diameter and are spaced at 5° increments about the valve element axis. The first aperture 364 is sized to initiate a baseline flow of about 0.15 gallons per minute. The remaining apertures 366 add incrementally to this flow. Optionally, a final aperture 368 may be relatively large so as to provide a large final increment to establish a particularly high flow rate in a shock treatment mode.

Figure 19:
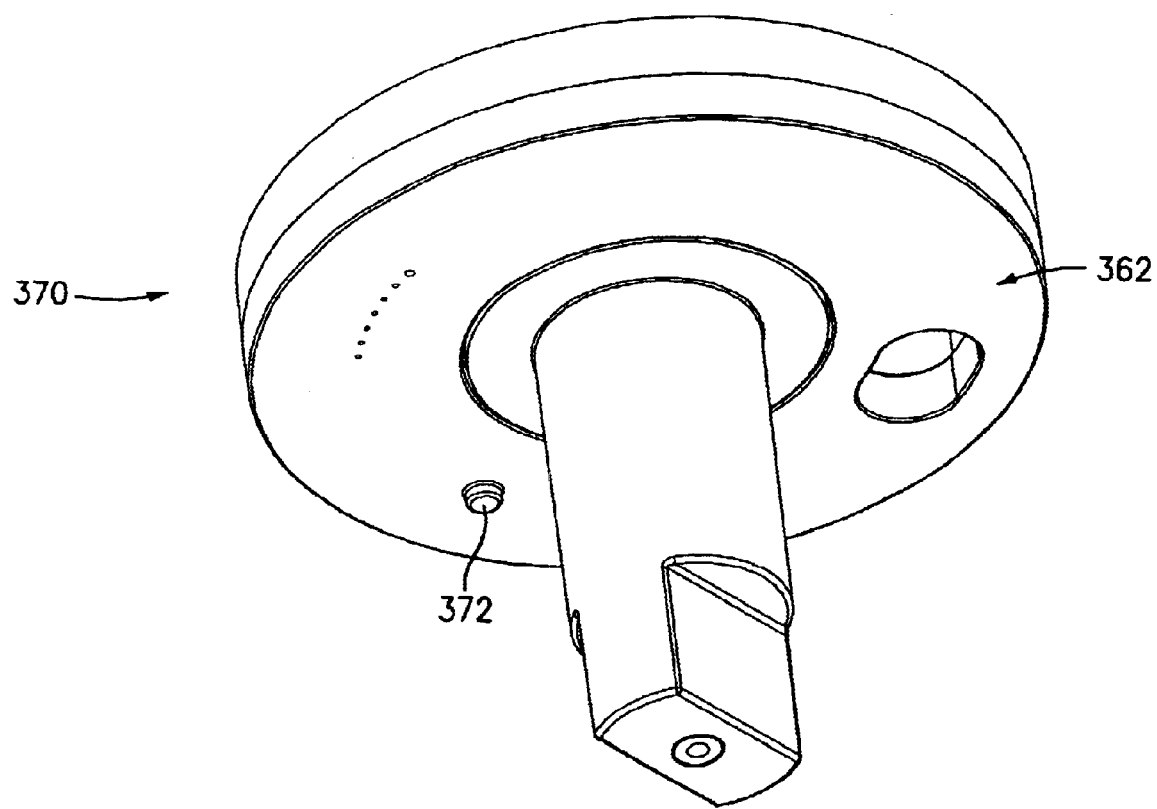
FIGS. 19 and 20 are views of an alternate valve element including the lower flange of FIG. 18.
Figure 20:
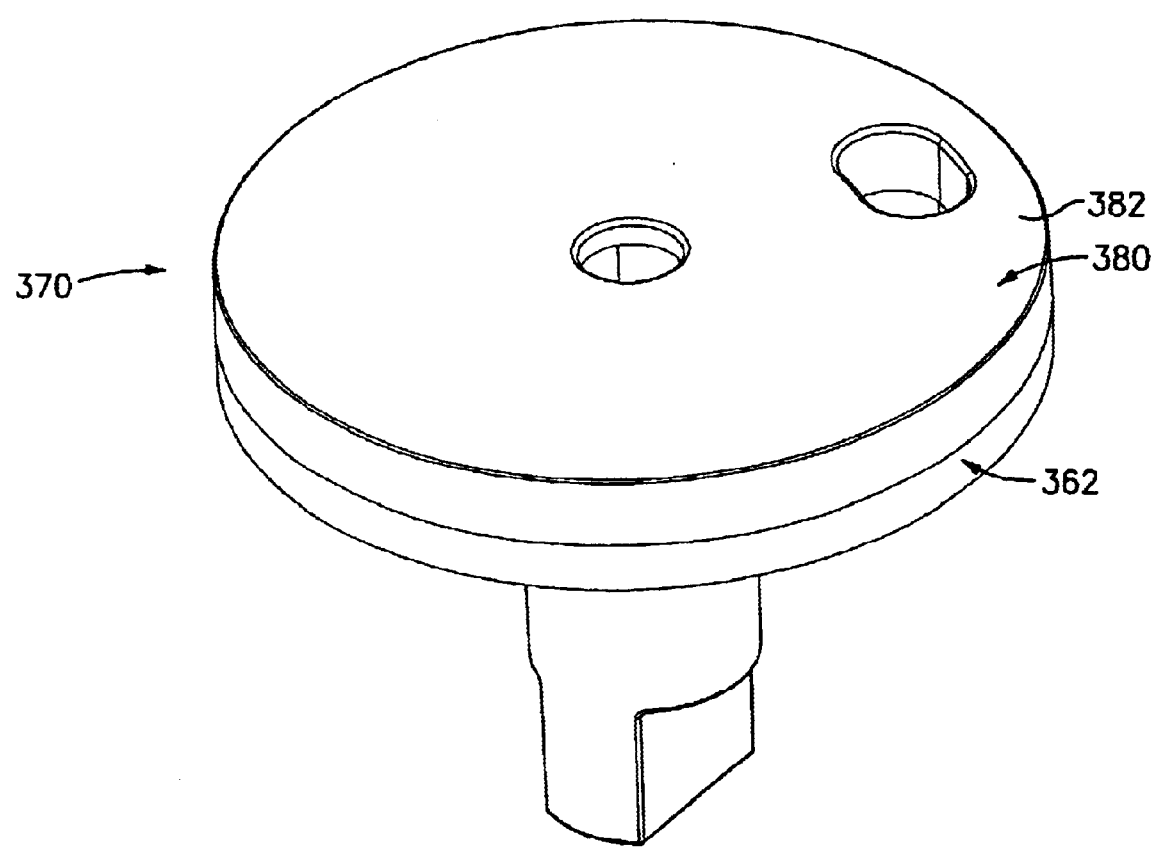

FIGS. 19 and 20 show a valve element 370 including the lower flange 362. The lower flange has a depending keying projection 372 (FIG. 19) which fits within a channel 374 (FIG. 11) to limit the rotational range of the element.

Figure 13:
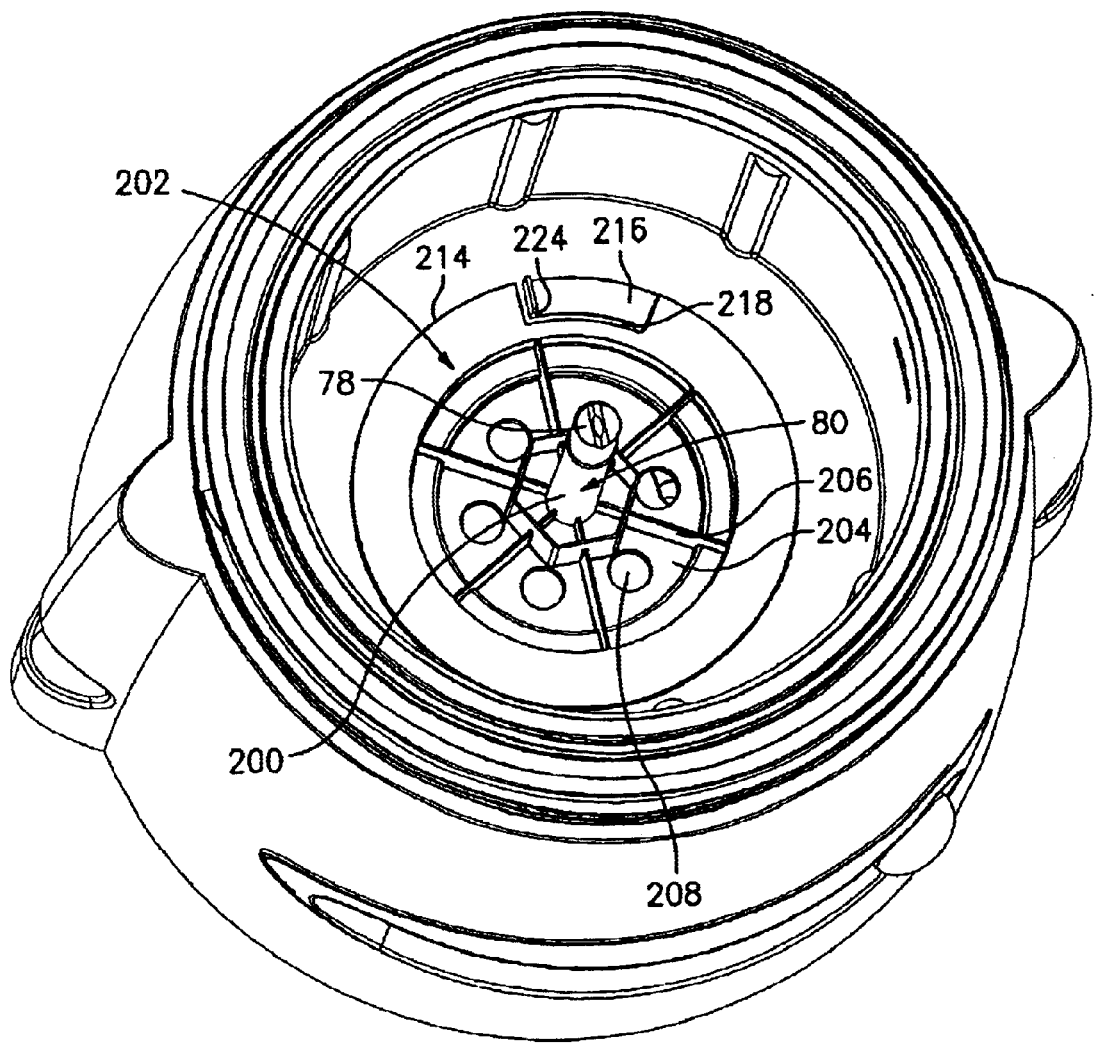
FIG. 13 is a view of the outlet chamber of the feeder of FIG. 3.
Figure 21:
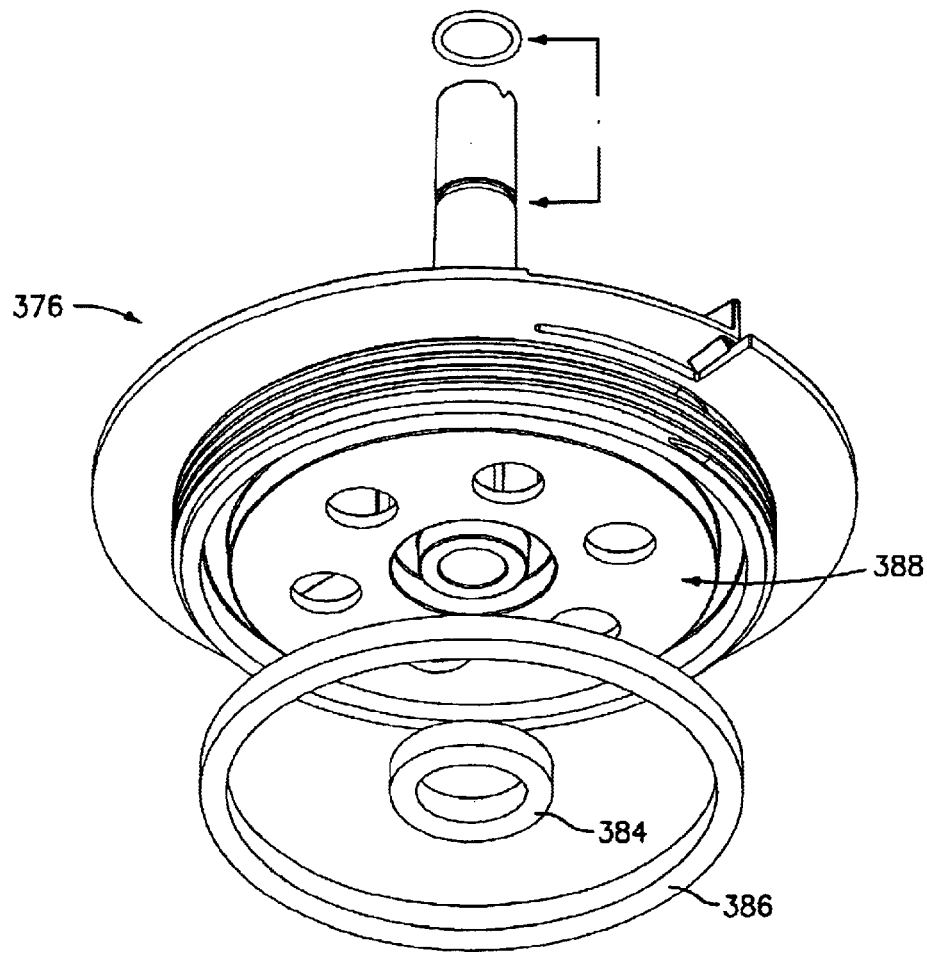
FIG. 21 is a partially exploded view of a conduit assembly for use with the valve element of FIGS. 19 and 20.

A second difference between the element 370 and the element 130 is associated with a difference between the conduit unit structure 376 (FIG. 21) and the structure 202 of FIG. 13. Specifically, the upper flange 380 of the element 370 has a flat upper surface 382 for bearing against inner and outer o-rings 384 and 386 (FIG. 17) (e.g., formed of VITON fluoroelastomer (DuPont Dow Elastomers L.L.C., Wilmington, Del.) with PTFE and graphite). These o-rings are formed having a section resembling a semi-circle atop a rectangle, with the rectangular portion carried in downwardly open channels in the lower surface of a flange portion 388 of the structure 376). Also, in the exemplary structure 376, the nozzle is unitarily incorporated rather than being a separate piece.

Figure 22:
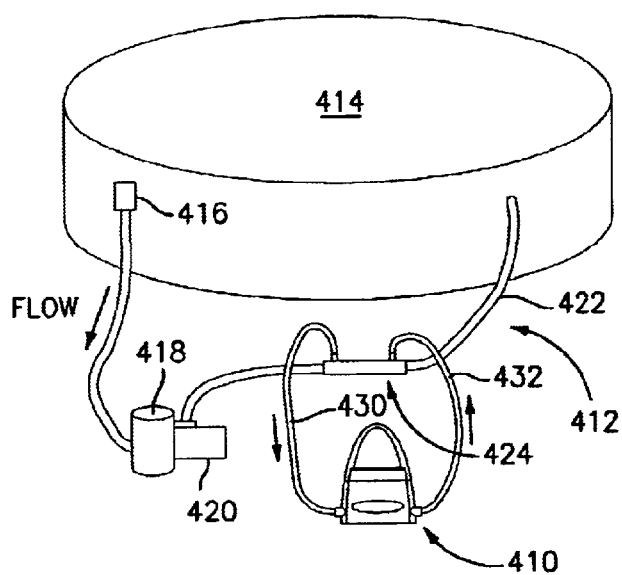
FIG. 22 is a diagram of an alternate exemplary pool circulation system.
Figure 23:
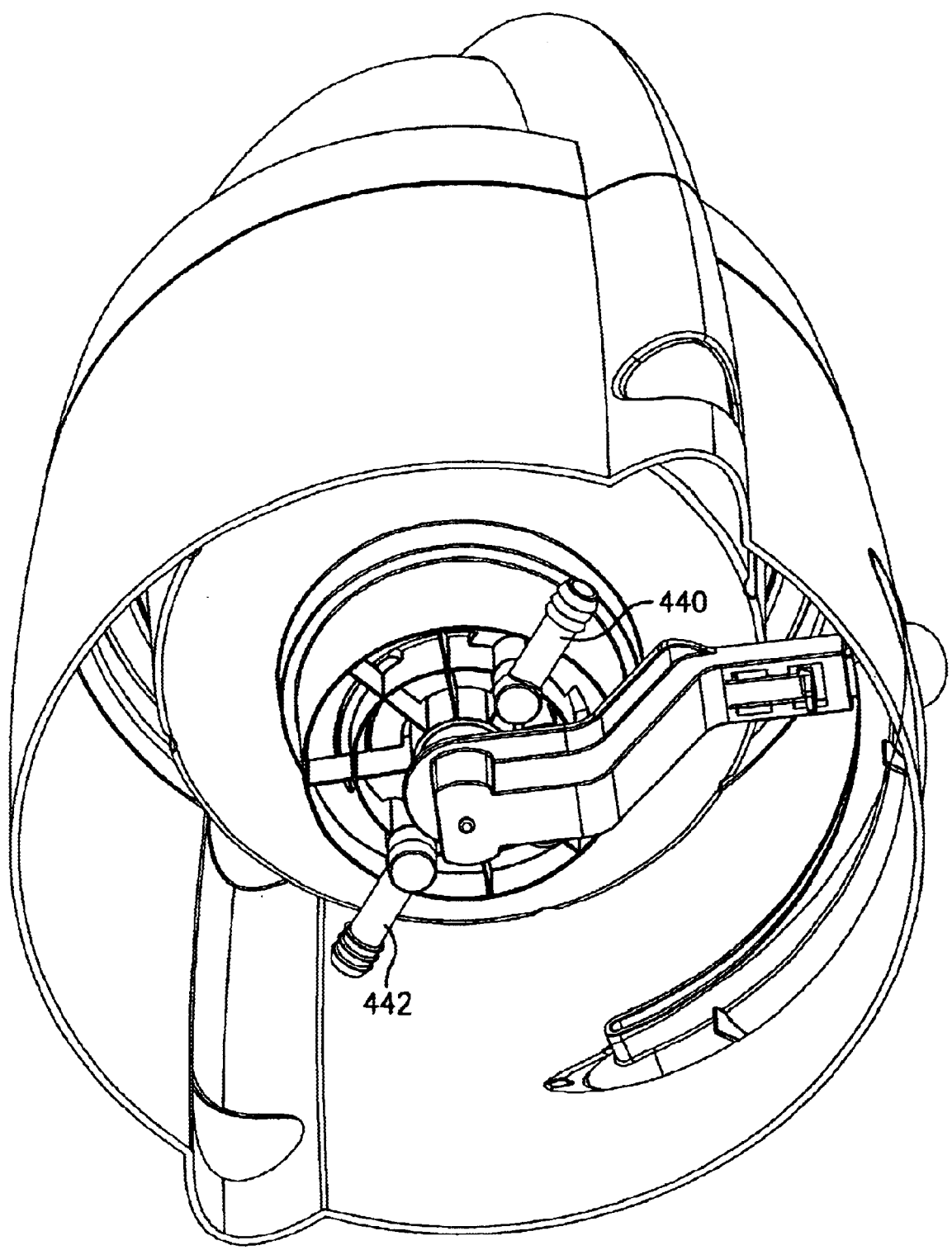
FIG. 23 is a view of an underside of a base of an alternate feeder.

FIG. 22 shows a feeder 410 associated with a circulation system 412 to/from a pool 414. Principal flow to/from the pool proceeds initially through a skimmer box 416 through a hair and lint strainer 418 to a pump 420 and therefrom returning to the pool in a return line 422. A diverter 424 is mounted in the return line 422 and has first and second lines 430 and 432 going respectively to and from the feeder 410 (FIG. 22). The first and second lines mate with first and second fittings 440 and 442 (FIG. 23) mounted to the underside of the feeder base (FIG. 23) and replacing the manifold and scoops of the feeder 34.

Figure 26:
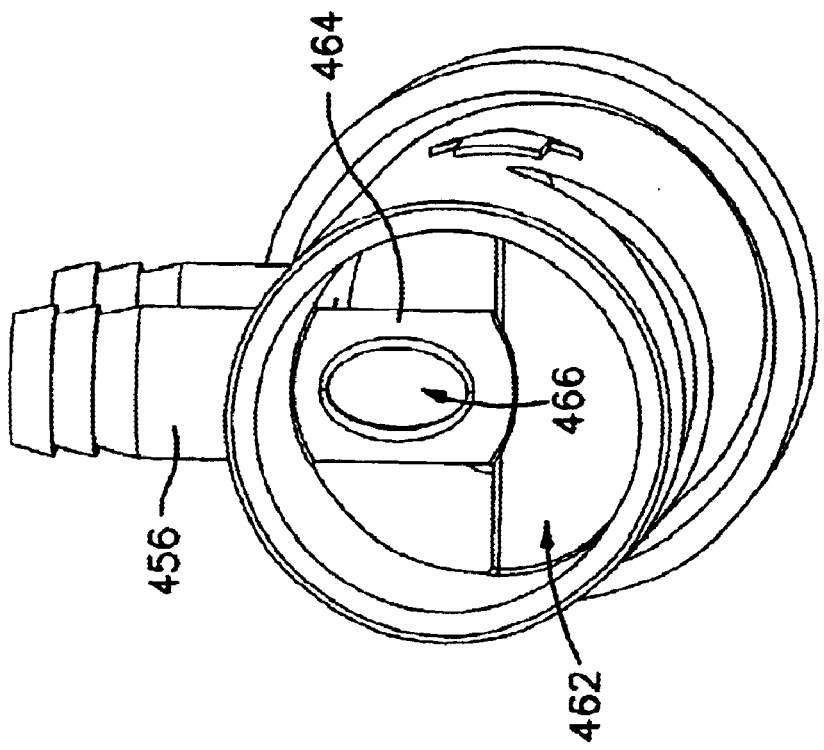

FIG. 24 shows the diverter 424. The diverter has a generally cylindrical one-piece molded body 450 extending from an upstream inlet end to a downstream outlet end. Molded inlet and outlet end caps 452 and 454 have a stepped tubular structure with smaller and larger diameter portions for respectively mating with smaller and larger flexible hose (e.g., 1.25 inch and 1.5 inch ID) forming the pool return line 422. First and second upstream and downstream port fittings 456 and 458 extend from the main portion of the body and connect to the lines 430 and 432, respectively. The exemplary fitting 456 is located proximate a restriction 460 in the body. The exemplary restriction 460 (FIG. 26 with inlet end cap removed) forms a ramp 462 extending inward to block a substantial portion of the transverse cross-section of the body. A tubular extension 464 of the fitting 456 extends into the body to meet the ramp 462 and has an upstream-facing aperture 466. As water passes through the diverter, a portion is forced through the aperture 466 to serve as the feeder inlet flow. The feeder outlet flow returns through the port 458. An exemplary application for the diverter 424 is a relatively low flow application involving approximately 20–50 gallons per minute flow through the pool return line. With this relatively low flow, a relatively high restriction is desired to provide an appropriate pressure difference across the diverter and thereby an appropriate flow through the feeder. For example, the ramp 462 may obstruct slightly more than half the cross-section of the diverter.

Figure 27:
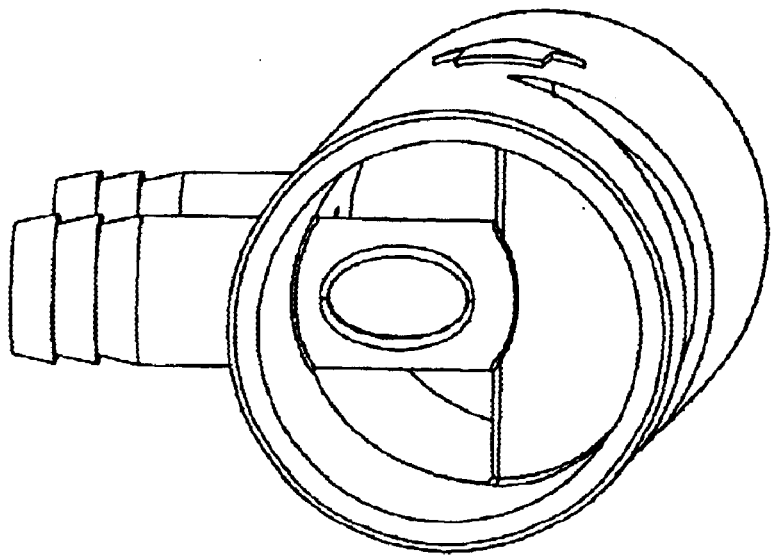
FIGS. 26 and 27 are views of the manifolds of FIGS. 24 and 25.

FIGS. 25 and 27 show an alternate diverter in which the ramp restricts slightly less than half the cross-section. This may be suitable to provide a similar flow through the feeder at a higher return line flow (e.g., 45–100 gallons per minute). This may be the case for relatively larger pools (typically in-ground), which use rigid conduit as a return line instead of flexible hose. Accordingly, this alternate diverter lacks hose fittings.

For purposes of illustration, a number of principal structural portions of the feeder are shown sectioned as if molded as thick-walled products. However, commercial products are preferably molded to produce thin walls via techniques such as injection molding. The views may also reflect other artifacts of the particular CAD process used to generate the drawings and of various engineering simplifications, none of which would affect the disclosure to one of ordinary skill in the art.

One or more embodiments of the present invention have been described. Nevertheless, it will be understood that various modifications may be made without departing from the spirit and scope of the invention. For example, there may be manifold physical implementations of the basic functional principles which have been outlined. Various manufacturing considerations may influence the form taken by any production feeder. Use in applications beyond swimming pools (e.g., industrial applications) is possible as is use in dispensing a variety of chemicals (e.g., sodium bisulfate useful for control of pH levels). Accordingly, other embodiments are within the scope of the following claims. All patent applications, patents and other publications cited herein are incorporated by reference in their entirety.

What is claimed is:

1. A feeder device for introducing a chemical into a flow of water comprising:
   a feeder inlet and a feeder outlet;
   a reservoir of the chemical in solid form and having a foraminate lower portion;
   a first conduit having an outlet and in communication with the feeder inlet in at least a first feeder condition;
   a wall surrounding the conduit outlet and extending upward thereof and, in at least said first feeder condition, maintaining a body of water in which said conduit outlet is immersed, wherein the wall has a plurality of first apertures through which said overflow passes in said first feeder condition, the first apertures having lower extremities that are above said conduit outlet yet below a lower extremity of an interior of the reservoir;
   an outlet chamber which in at least said first feeder condition receives overflow containing the dissolved chemical from the body and is in communication with the feeder outlet.

2. The device of claim 1 wherein said conduit outlet comprises a flat fan nozzle aimed upward.

3. The device of claim 1 wherein the nozzle has dimensions effective to carry a water flow rate of between 0.2 gpm and 2 gpm (0.8 and 8 liters/minute) at 5 psig.

4. The device of claim 1 wherein said wall has:
   a continuous portion extending to a height above the conduit outlet so that upon a termination of the flow through the conduit outlet the conduit outlet remains below a surface of the body in a second feeder condition.

5. The device of claim 4 wherein the continuous portion ends a height below a lowest height of the chemical in the reservoir so that in the second feeder condition the surface of the body is below said lowest height.

6. The device of claim 1 wherein:
   the reservoir comprises an inverted polymeric bottle having an externally threaded portion engaged to an internally threaded receptacle of the feeder when installed thereto;
   a removable feeder cover has an installed condition covering the inverted bottle and sealed relative to a feeder body so as to permit a feeder headspace to be maintained at a pressure of 10 psig.

7. The device of claim 1 further comprising:
   a user-actuated manual valve controlling flow through the conduit outlet.

8. The device of claim 7 wherein:
   the user-actuated manual valve comprises a valve element rotatable about a valve axis through a plurality of orientations;
   in a first group of said orientations the valve element provides a plurality of different degrees of restriction of the flow through the outlet conduit;
   in at least one second of said orientations, the valve element prevents the flow through the conduit outlet and permits a drain flow from the outlet chamber and bypassing the feeder outlet.

9. The device of claim 8 further comprising:
   a drain pan nondestructively removeably positioned below the valve element so as to receive the drain flow.

10. The device of claim 8 wherein:
    the valve element comprises upper and lower surfaces;
    an axle depends from the lower surface; and
    a lever extends radially from the axle and is graspable by the user to rotate the valve element between the plurality of orientations.

11. The device of claim 8 wherein:
    the valve element comprises upper and lower surfaces;
    the valve element is held in compression between a flange at a proximal end of the conduit and a body portion of the feeder; and
    the valve element has a first upper port aligned with an inlet of the conduit and a first lower port in communication with the first upper radially displaced from the valve axis.

12. The device of claim 8 wherein the valve element comprises:
    upper and lower surfaces;
    an inlet port in the lower surface, radially displaced from the valve axis and receiving water from the feeder inlet in the first feeder condition;
    a central outlet port in the upper surface and admitting water to the first conduit in the first feeder condition; and
    a passageway penetrating the upper and lower surfaces and passing the overflow in the first feeder condition.

13. The device of claim 12 wherein the inlet port in the lower surface comprises a n array of apertures in a lower flange of the valve, the apertures arranged at a plurality of different angular locations about a central axis of the valve element.

14. The device of claim 1 wherein:
    in said first feeder condition, a flow through the conduit outlet represents a diversion of between 0.5% and 10% of a flow between the feeder inlet and outlet;
    in a second feeder condition, there is substantially no flow through the conduit outlet and the flow between the feeder inlet and outlet is substantially the same as in the first feeder condition.

15. The device of claim 1 wherein the chemical consists essentially of calcium hypochlorite, dichloroisocyanuric acid, trichloroisocyanuric acid or combinations thereof.

16. The device of claim 15 wherein the water flow is a recirculating flow to/from a swimming pool and the chemical consists essentially of briquetted calcium hypochlorite.

17. The device of claim 1 wherein the reservoir comprises: a container nondestructively removably coupled to a receptacle portion of the feeder and having an interior and a mouth, the mouth being covered by said foraminate lower portion.

18. A feeder device for introducing a chemical into a flow of water comprising:
- a feeder inlet and a feeder outlet;
- a reservoir of the chemical in solid form and having a foraminate lower portion;
- a first conduit having an outlet and in communication with the feeder inlet in at least a first feeder condition;
- means for maintaining a body of water in which said conduit outlet is immersed in at least said first feeder condition;
- means for altering flow through the conduit to locally elevate a surface of said body between;
- a first level in said first feeder condition in which the body contacts the chemical in the reservoir so as to dissolve such chemical;
- a second level in a second feeder condition in which the body does not contact the chemical in the reservoir; and
- means for, in at least said first feeder condition, directing flow containing the dissolved chemical from the body to the feeder outlet.

19. The device of claim 18 wherein said conduit outlet comprises a flat fan nozzle aimed upward and the elevation is limited to a central portion of an upper surface of the body above the flat fan nozzle.

20. The device of claim 18 wherein said means for maintaining comprise a wall having:
- a plurality of first apertures through which said overflow passes in said first feeder condition.

21. The device of claim 18 wherein:
- the reservoir comprises an inverted polymeric bottle having an externally threaded portion engaged to an internally threaded receptacle of the feeder when installed thereto;
- a removable feeder cover has an installed condition covering the inverted bottle and sealed relative to a feeder body so as to permit a feeder headspace to be maintained at a pressure of 8 psig.

22. A pool water treatment system comprising:
- the device of claim 1;
- at least one pump;
- a filter; and
- a conduit network coupling the device, pump, and filter to a swimming pool for filtering and chlorinating a recirculating a flow of water to/from the pool.

23. A device for introducing chlorine from a chlorine containing pool treatment chemical into a flow of water to/from a swimming pool comprising:
- a feeder inlet receiving water from the flow;
- a reservoir of the chemical in solid form and having a foraminate lower portion;
- a first conduit having an outlet and in communication with the feeder inlet in at least a first feeder condition;
- a wall surrounding the conduit outlet and extending upward thereof and, in at least said first feeder condition, maintains a body of water in which said conduit outlet is immersed, the first conduit in said first feeder condition discharging water through the conduit outlet at a rate and speed effective to locally elevate a first surface portion of the body by a height of between 0.125 inch and 1.0 inch above another surface portion of the body so that the first surface portion contacts the chemical to dissolve the chemical;
- an outlet chamber which in at least said first feeder condition receives said dissolved chemical; and
- a feeder outlet returning said dissolved chemical to the flow.

24. The device of claim 23 wherein said height is between 0.25 inch and 0.5 inch.

25. The device of claim 23 wherein said foraminate lower portion is at least 0.0625 inch above said another surface portion.

26. A method for introducing a treatment chemical into a body of water at a controlled rate comprising the acts of:
- providing a feeder having an inlet, an outlet, and containing a solid chemical in a chemical reservoir;
- causing a flow of water from the body to enter the feeder through the inlet and exit through the outlet to return to the body so as to run the feeder in at least a steady state first condition wherein:
  - at least a first portion of the flow is directed through a conduit outlet into a first body of water so as to produce at least one local elevation of a portion of a surface of that first body, the local elevation contacting a foraminate lower portion of a reservoir of said treatment chemical in solid form so as to dissolve said treatment chemical; and
  - said dissolved treatment chemical is directed to said outlet; and
- restricting at least said first flow portion so as to disengage the first body of water from the reservoir and cause the feeder to enter at least a steady state second condition.

27. The method of claim 26 wherein in the second condition the conduit outlet remains immersed in the body.

28. The method of claim 27 wherein the first portion of the flow represents between 0.1% and 10% of the total flow through the feeder.

29. The method of claim 26 wherein the restricting comprises turning a valve element from a first orientation in said first condition to a second orientation.

30. The method of claim 26 further comprising:
- removing a feeder cover;
- removing the reservoir in a depleted condition;
- replacing the reservoir with an undepleted replacement reservoir;
- replacing the feeder cover; and
- de-restricting the flow to return the feeder to the first condition.

31. A chemical container in a condition installed on a receptacle of a chemical feeder and, comprising:
- said chemical, comprising in major part calcium hypochlorite;
- a molded plastic body containing the chemical and having:
  - an open lower end;
  - a closed upper end; and
  - an externally-threaded portion proximate the lower end in threaded engagement to
  - a complementary internally-threaded portion of the receptacle; and
  - a foraminate cover extending across the container mouth an at least partially supporting the chemical and having a central portion immersed in a locally elevated central portion of a body of water.

32. The chemical container of claim 31 wherein:
- the body and foraminate cover consist essentially of polyethylene.

* * * * *